(12) United States Patent
Gaston

(10) Patent No.: US 11,498,136 B1
(45) Date of Patent: Nov. 15, 2022

(54) BLACK HAWK BUSHING REMOVAL AND REAMER DEVICE

(71) Applicant: James D Gaston, Meridianville, AL (US)

(72) Inventor: James D Gaston, Meridianville, AL (US)

( * ) Notice: Subject to any disclaimer, the term of this patent is extended or adjusted under 35 U.S.C. 154(b) by 0 days.

(21) Appl. No.: 17/683,543

(22) Filed: Mar. 1, 2022

Related U.S. Application Data

(63) Continuation-in-part of application No. 16/991,874, filed on Aug. 12, 2020, now abandoned.

(51) Int. Cl.
*B23B 47/28* (2006.01)
*B23D 77/00* (2006.01)

(52) U.S. Cl.
CPC .......... *B23B 47/28* (2013.01); *B23B 2247/12* (2013.01); *B23D 77/00* (2013.01)

(58) Field of Classification Search
CPC ..... B23B 47/28; B23B 47/287; B23B 47/288; B23B 2247/12; B23B 2247/14; B23B 2247/06; B23B 45/003; B23D 77/00
See application file for complete search history.

(56) References Cited

U.S. PATENT DOCUMENTS

| | | |
|---|---|---|
| 2,625,997 A | 11/1946 | Doak |
| 3,717,317 A | 2/1973 | Certain |
| 5,597,138 A | 1/1997 | Arlton et al. |
| 7,867,234 B2 | 1/2011 | Collazo |
| 8,186,031 B2 | 5/2012 | Whitney et al. |
| 2009/0304315 A1 | 12/2009 | Johnson |
| 2016/0158925 A1 | 6/2016 | Robb |
| 2016/0368134 A1 | 12/2016 | Hafenrichter et al. |

*Primary Examiner* — Ryan Rufo
(74) *Attorney, Agent, or Firm* — Cynthia R. Wright

(57) ABSTRACT

The device disclosed herein allows a user to maintain the outboard stabilator of a Blackhawk helicopter. The device, which comprises a kit, allows a user to remove damaged outdoor stabilator bushings from a Blackhawk. Upon removal, the device enables a user to install new outdoor stabilator bushings. Additionally, the device allows a user to ream the newly installed outdoor stabilator bushings so that the outboard stabilator may be reinstalled upon the Blackhawk and safely flown.

6 Claims, 35 Drawing Sheets

BLACK HAWK BUSHING REMOVAL AND REAMER DEVICE

CROSS-REFERENCE TO RELATED APPLICATIONS

This application is a continuation in part application and claims priority to U.S. patent application Ser. No. 16/991,874, which was filed on Aug. 12, 2020.

DISCLOSURE REGARDING PRIOR DISCLOSURES BY THE INVENTOR OR A JOINT INVENTOR

The inventor has not disclosed this invention prior to the filing of this non provisional application.

BACKGROUND OF THE INVENTION

(1) Field of the Invention

The Black Hawk helicopter is a crucial component of the U.S. Army air attack fleet. In order to keep the Black Hawks in the air, maintenance and repair of necessary systems and components must be performed at bases around the world and in the field during military operations. Currently, there is not a viable method of replacing worn or defective bushings in the stabilator. Stabilators with worn or defective bushings often are removed from service at great expense to the taxpayer, and down time for the Black Hawk awaiting a replacement stabilator. The invention disclosed herein is a maintenance and repair kit and process, or method of using said kit, for replacing worn or defective special bushings in the stabilator of Black Hawk helicopters, without removing electrical wiring and brackets for the stabilator attitude sensor. Disclosed herein is an embodiment for the Black Hawk helicopter. This kit allows maintenance of the Black Hawk helicopter stabilator in remote areas of military operations.

(2) Disclosure of the Prior Art

The Sikorsky UH-60 Black Hawk (commonly referred to as "Black Hawk") is a four-blade, twin-engine, medium-lift utility helicopter manufactured by Sikorsky. Black Hawks have served in combat during conflicts in Grenada, Panama, Iraq, Somalia, the Balkans, Afghanistan, and other areas in the Middle East. The 2012 unit cost of the Army's UH-60L Black Hawk was $5.9 million. The stabilator moves during flight so that during hover or low speed flight the stabilator is angled downward to bring its leading edge more in line with the main rotor thrust and reduce its impact. When the UH-60 got moving, the stabilator automatically adjusts its position as a function of airspeed and collective pitch input. This motion recreates wear and tear on the stabilator bushings causing wear damage to the bushings necessitating replacement of the bushings, or replacement of the stabilator if the bushing can not be replaced.

Patent application US 2016/0158925 A1 discloses a spherical bushing replacement and installation tool that is used to service Bell 206 JetRanger and Bell OH-58 Kiowa Warrior helicopter swashplate assembly. The device of application 2016/0158925 A1 will not work on the Black Hawk helicopter because the device spherical bushing used in the Bell 206 JetRanger and the Bell OH-58 Kiowa Warrior, which includes a spherical bushing with a threaded hole that is used to insert the removal tool, differs from the spherical bushing of the Black Hawk, that lacks a threaded hole to insert the removal tool.

Since the introduction of the first Black Hawk almost 40 years ago, the Black Hawk has been the Army's front line utility helicopter, and it shows no signs of letting up. This heavy workload has meant that maintenance units could not keep up with the Black Hawk's unexpectedly high work load. In order to provide spare parts for combat operations, the U.S. Army has had to ground Black Hawks reducing their time in theater significantly. During the numerous foreign military operations in deserts, Black Hawks flying low to the ground have experienced wear and tear, and damage from sand striking the stabilator. Over time, desert sand damages the bushings in the Black Hawk reducing the functionality of the tail rotor requiring the aircraft to be grounded for maintenance. Currently, the stabilator must be removed from the aircraft and replaced. This typically results in a lengthy downtime for an aircraft, reducing the number of attack aircraft available for missions. A method of repairing and maintaining the stabilator is needed. This method should be less expensive than stabilator replacement, be performed by a maintenance crew in an active war zone, and not effect the integrity of the Black Hawk aircraft.

BRIEF SUMMARY OF THE INVENTION

Briefly, this device comprises a spherical bushing removal tool that allows the damaged bushing and its housing to be removed from the stabilator. First, the stabilator containing the damaged bushing is removed from the Black Hawk by maintenance crew. This kit provides the means to remove the damaged bushing from the Black Hawk stabilator, including a damaged split bushing. The kit provides the means to re-install a new full bushing, adhere a washer opposite the full bushing, and ream the interior cavity of the full bushing so that it is smooth and within tolerances. Finally, crew re-installs the stabilator with the replacement bushing back onto the Black Hawk.

This kit and process allows for the replacement of a damaged bushing in the Black Hawk stabilator to be replaced within a hour or so by a trained technician. All tools and parts necessary to make the repair are included in a carrying case. The technician is able to service the Black Hawk helicopter stabilator anywhere there is a ample space to secure the stabilator. The kit and process can be utilized in the field, including in areas where enemy are engaged reducing down time for the Black Hawk and enhancing the war fighting capability of the Black Hawk fleet.

BRIEF DESCRIPTION OF THE DRAWINGS

The invention is described in detail below with reference to the appended drawings.

FIG. 1 depicts a top, angled exterior view of the stabilator detached from the Black Hawk so that the bushings are visible.

FIG. 2 is an enlarged view of the stabilator bushings shown in FIG. 1.

FIG. 3 is a mid-sectional view of the spacer cup positioned onto the removal bolt during the removal of the full bushing.

FIG. 4 depicts an angled exterior view of the stabilator during the split bushing removal process.

FIG. 5 is an exploded view of FIG. 4.

FIG. 6 is an angled exterior view of the stabilator during the installation of the replacement full bushing, and an exploded view is shown in FIG. 7.

FIG. 8 depicts a newly-installed bushing.

FIG. 9 illustrates the spring clamping of the replacement bushing during adhesive curing, and FIG. 10 depicts and exploded view of the spring clamping.

Figure 11:
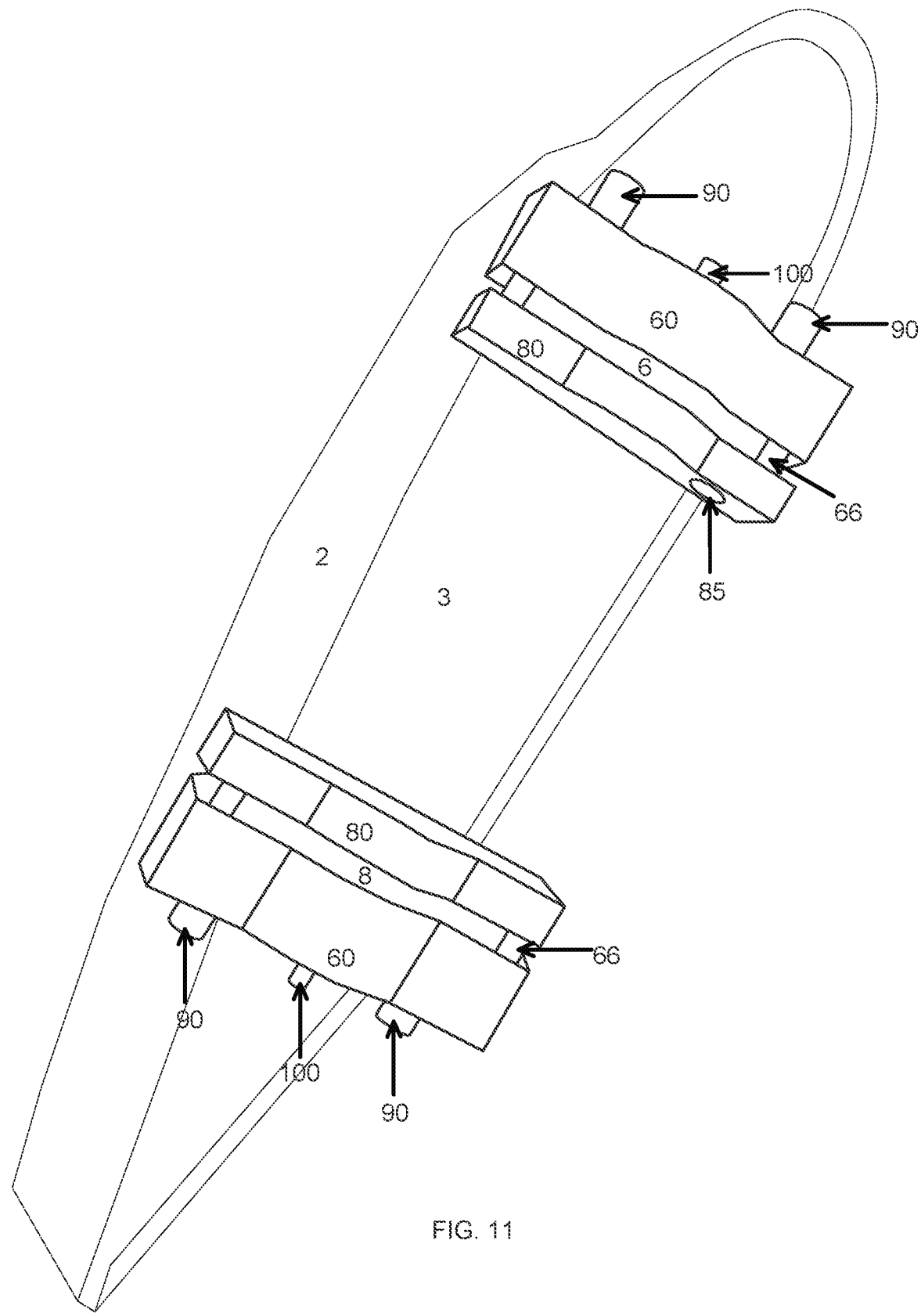

The positioning of the reaming block assembly onto the replacement bushings is shown in FIG. 11.

Figure 12:
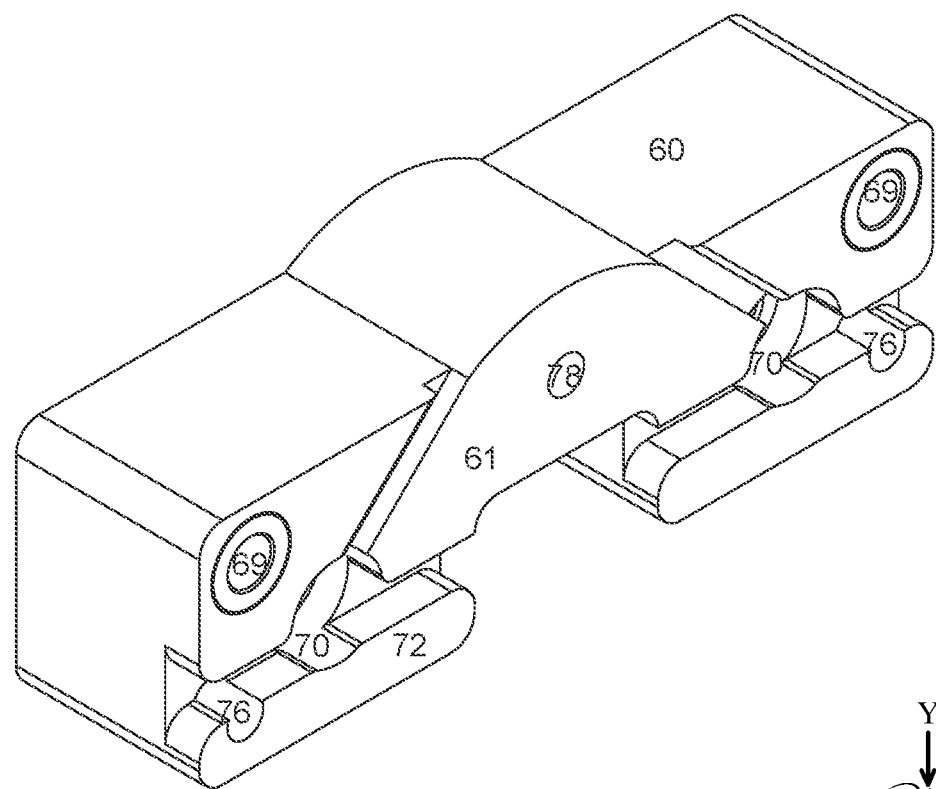
Figure 12A:
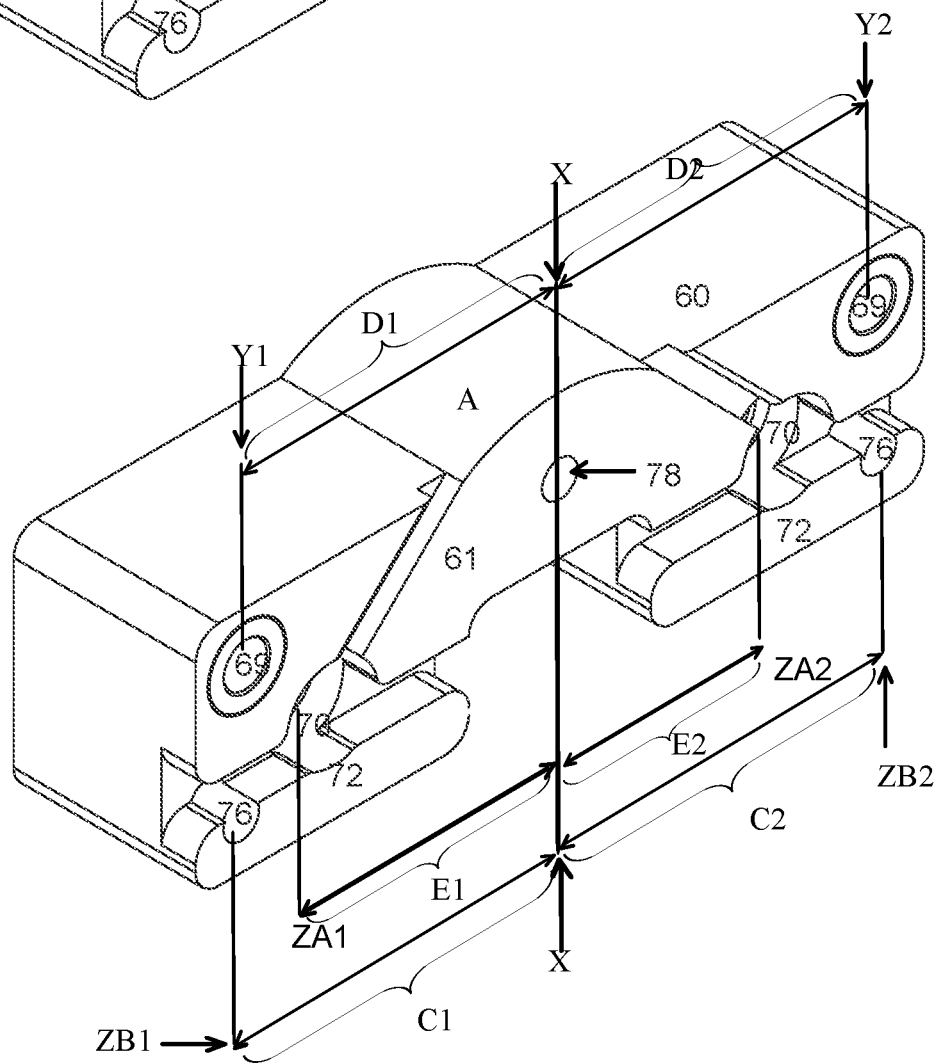

A angled interior view of the outer reaming block is shown in FIG. 12. FIG. 12A is a view of FIG. 12 with dimension lines.

Figure 13:
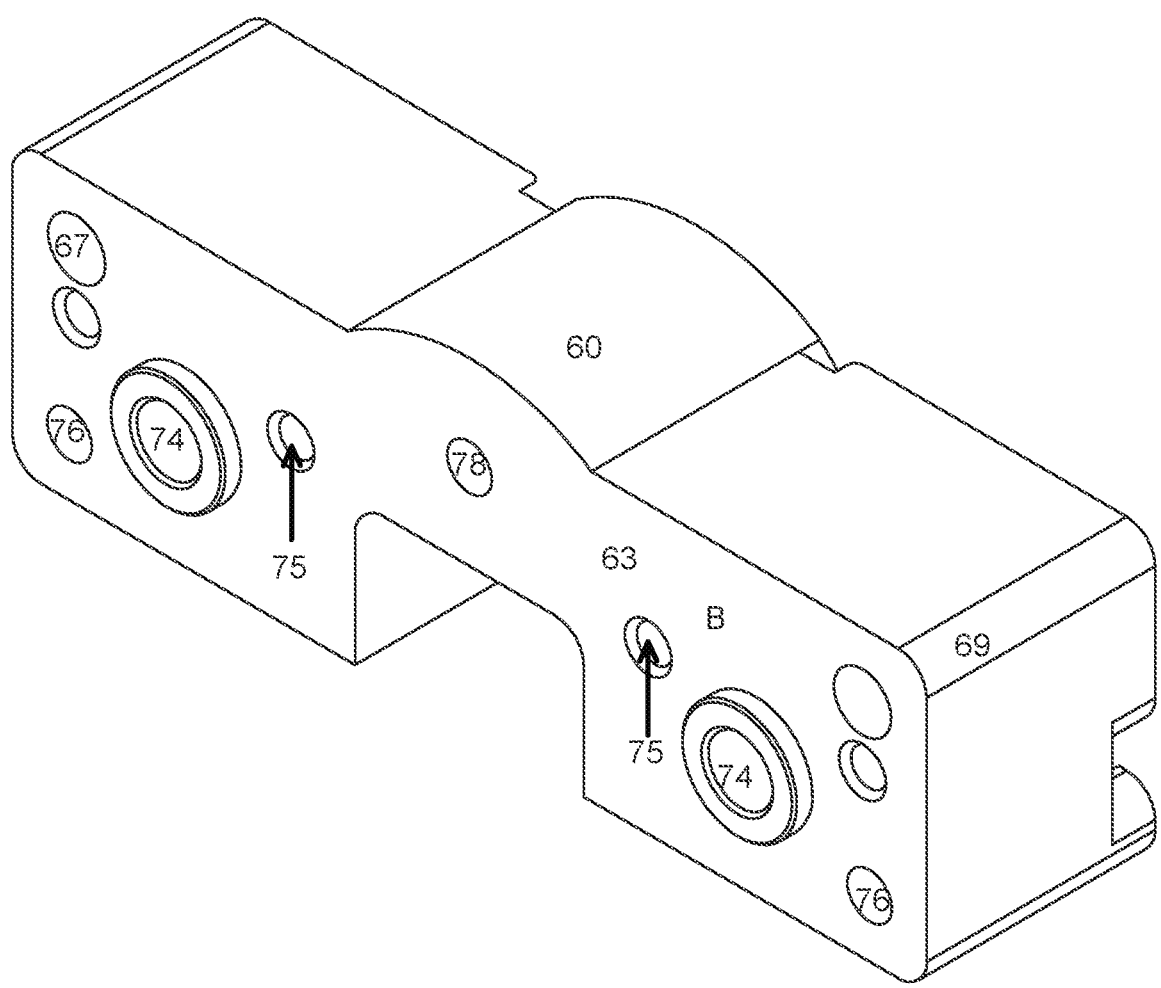
Figure 13A:
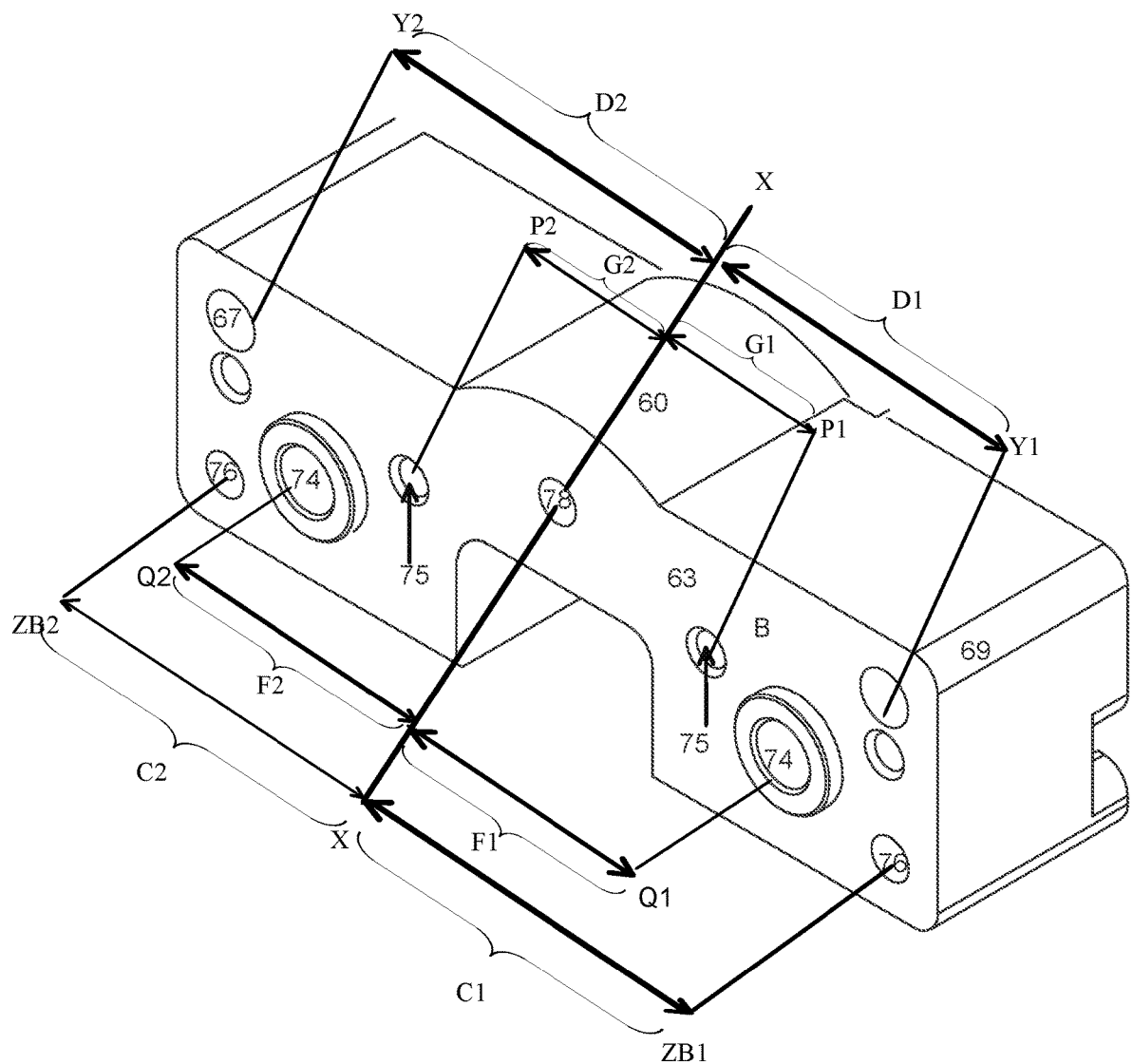

An angled exterior view of the outer reaming block is shown in FIG. 13, while FIG. 13A is a view of FIG. 13 with dimension lines.

Figure 14:
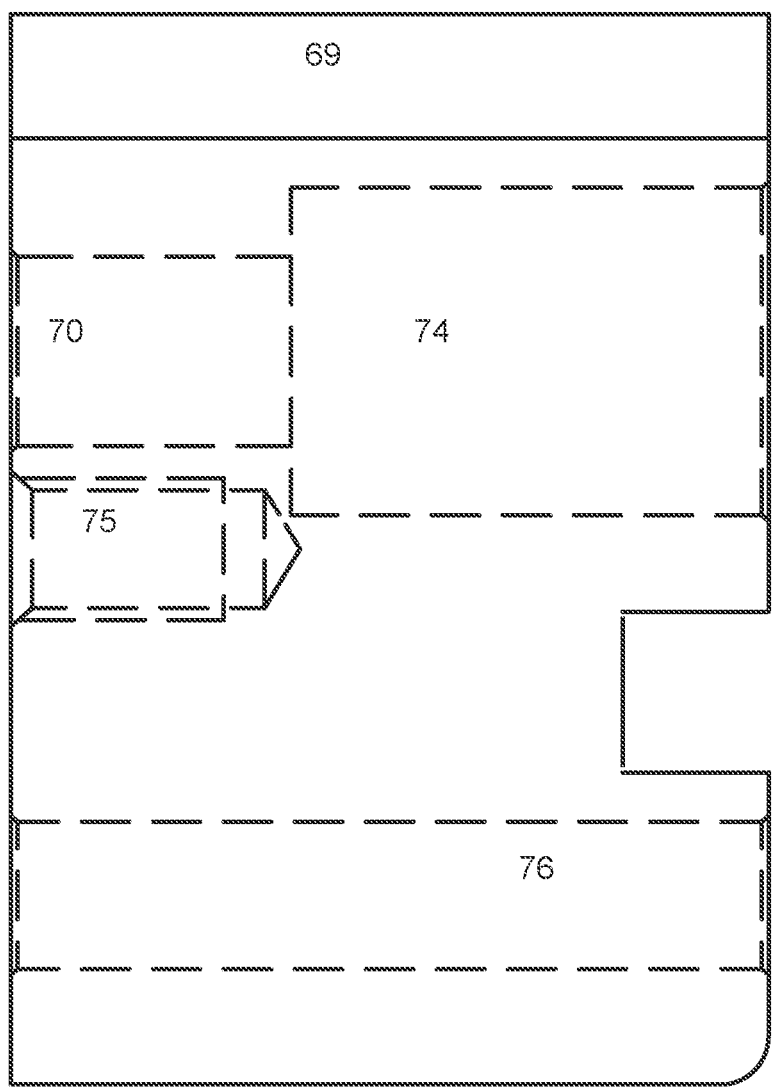

A mid-sectional view of the outer reaming block is illustrated in FIG. 14.

Figure 15:
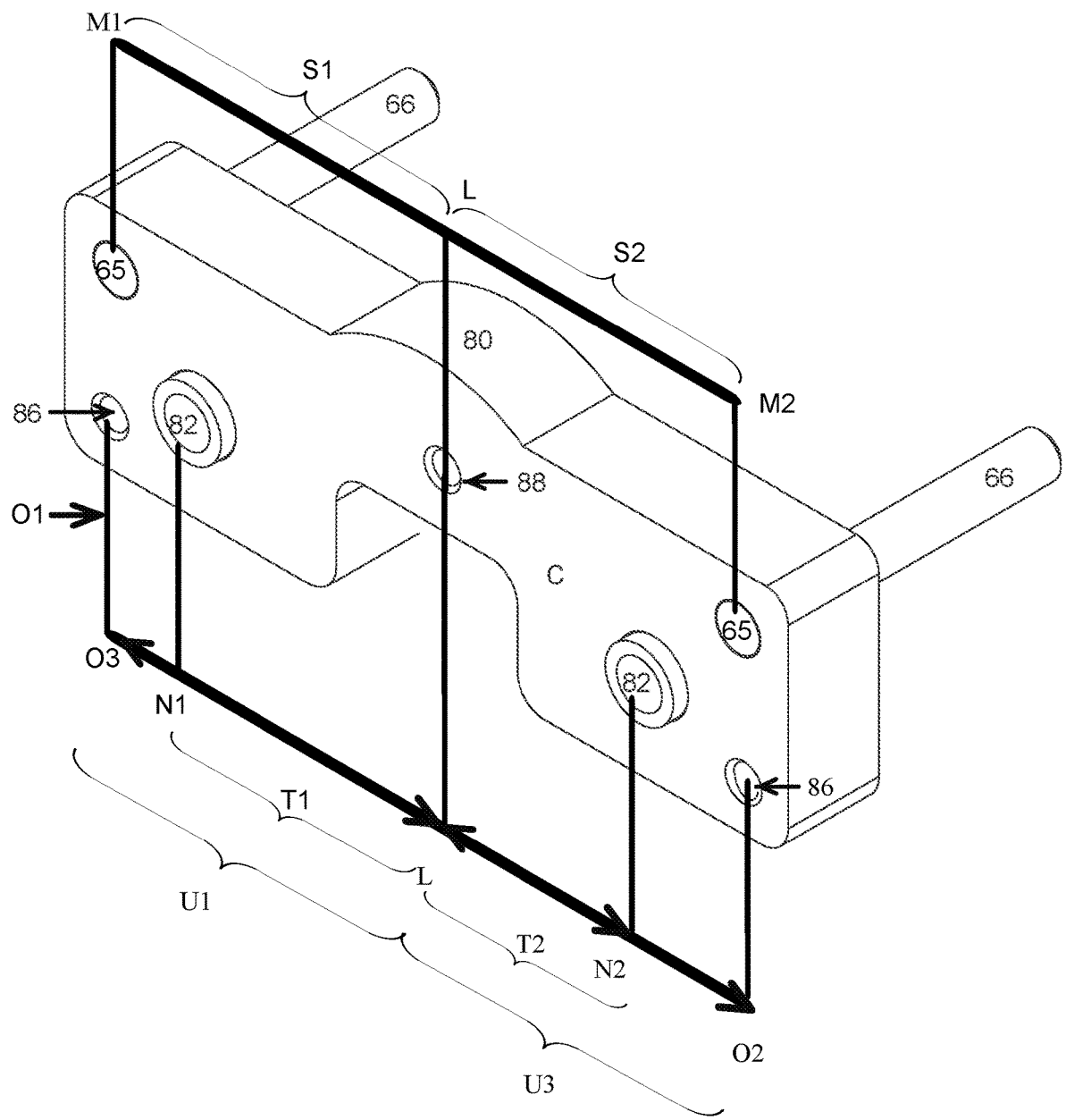
Figure 16:
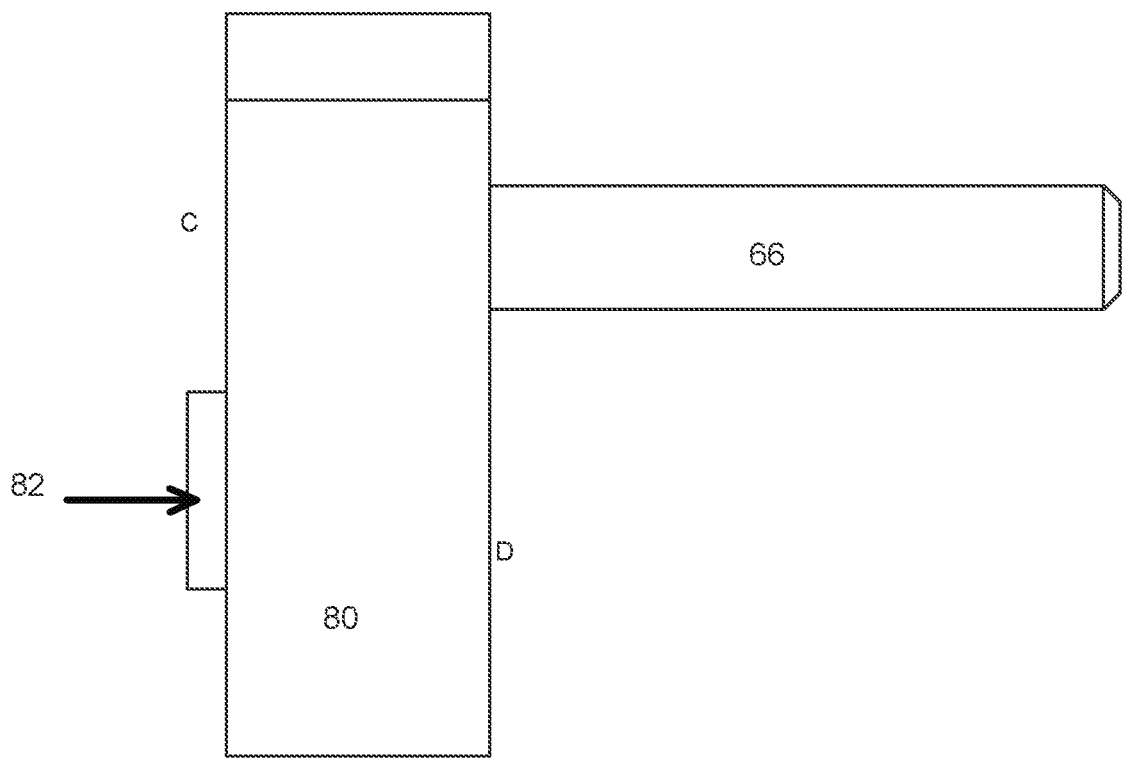

An angled exterior view of the inner reaming block with dimension lines is illustrated in FIG. 15, and a side view of FIG. 15 is shown in FIG. 16.

Figure 17:
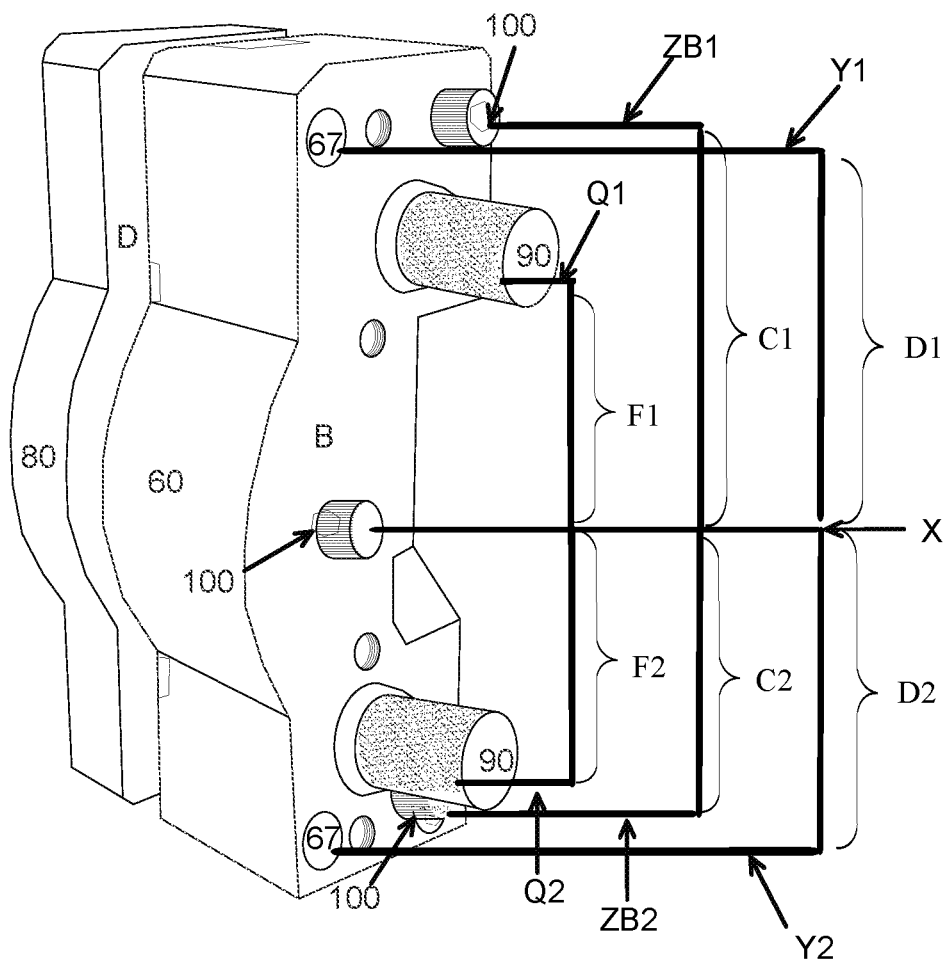

FIG. 17 illustrates an angled view of the inner reaming block coupled to the exterior reaming block with dimension lines.

Figure 18:
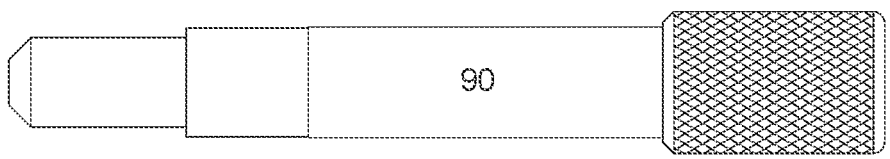
Figure 19:
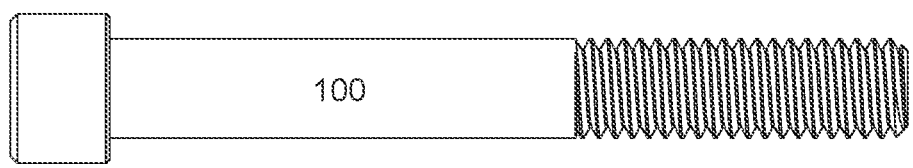

A side view of the alignment pin utilized to couple the inner and exterior reaming blocks together is depicted in FIG. 18. And, a side view of alignment bolts is shown in FIG. 19.

Figure 20:
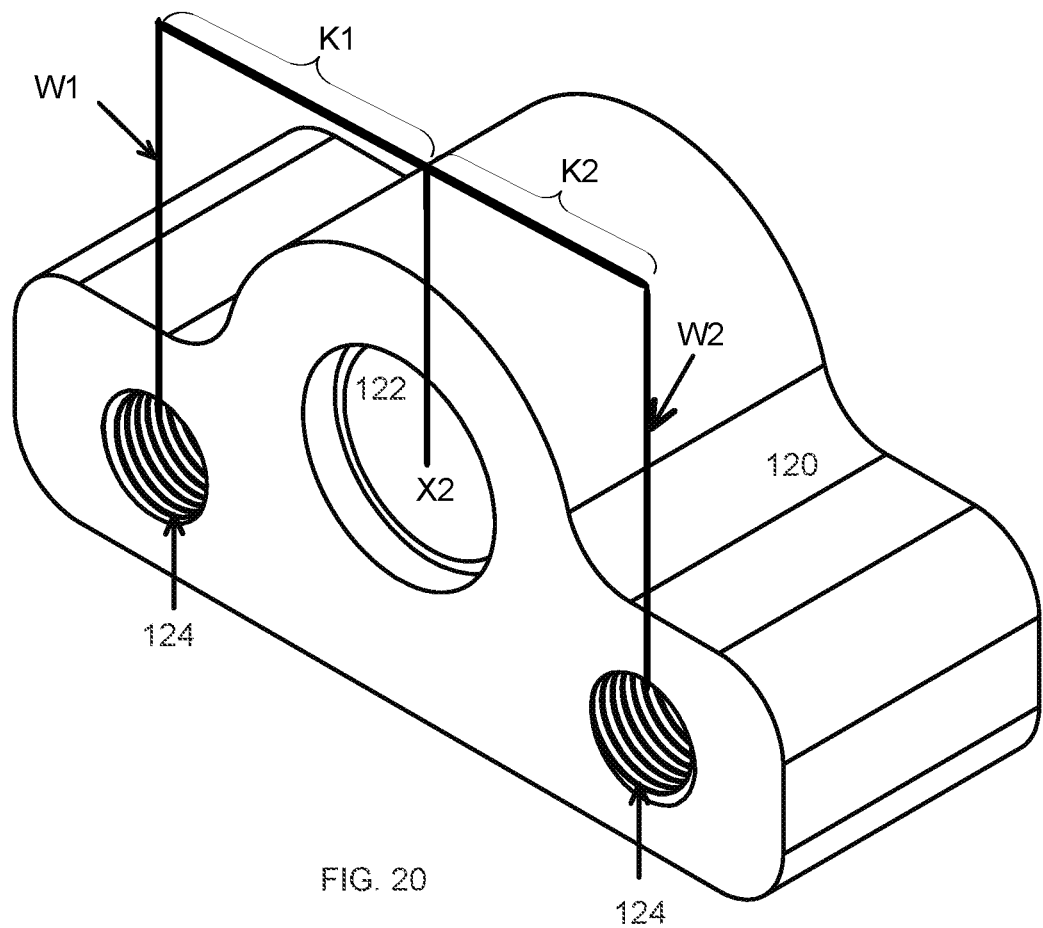

A front, angled view of the reamer guide block with dimension lines is shown in FIG. 20.

Figure 21:
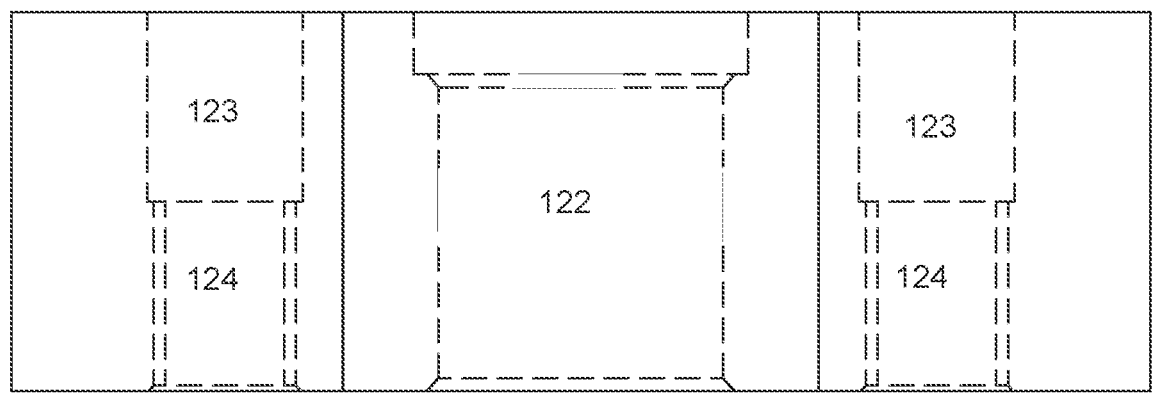

A mid-sectional view of the reamer guide block is depicted in FIG. 21.

Figure 22:
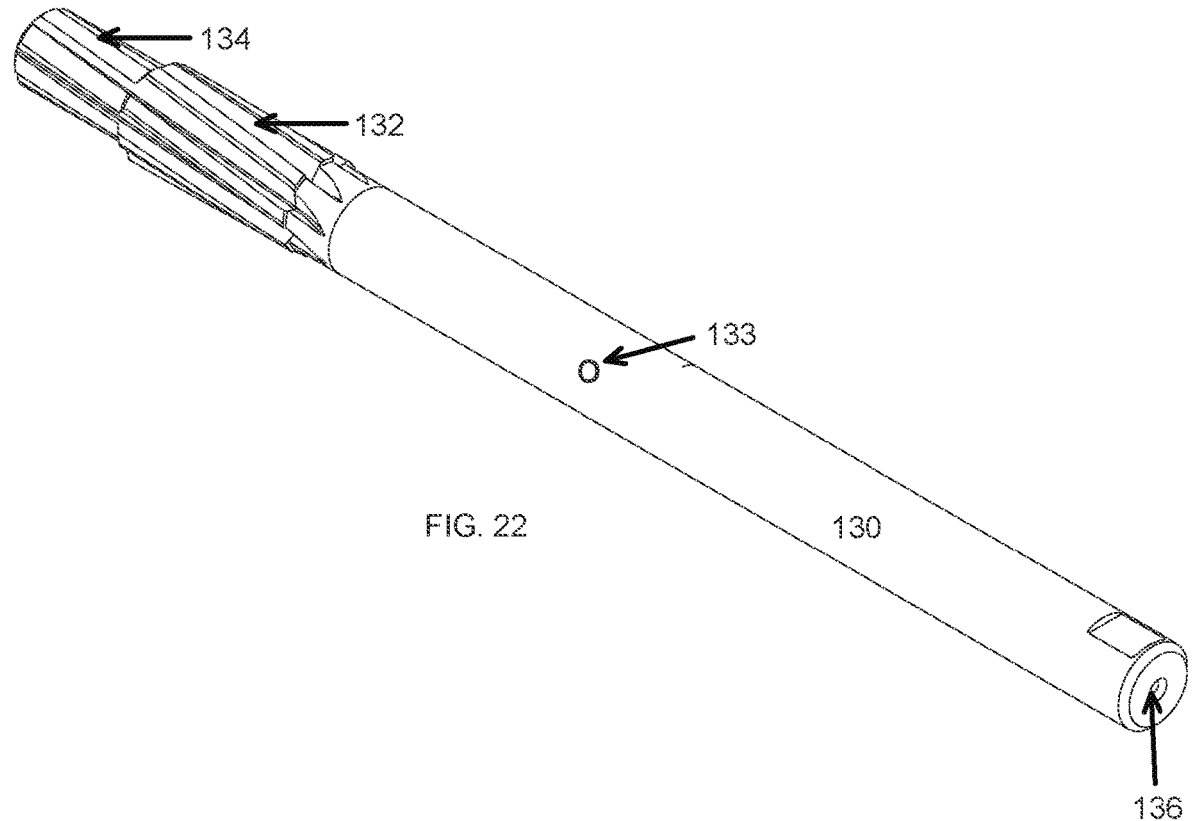
Figure 23:
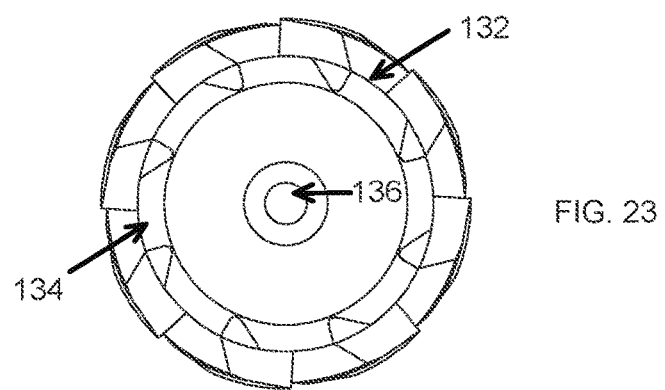

FIG. 21 depicts the guide pin, FIG. 22 depicts the reamer, and FIG. 23 depicts a end view of the reamer.

Figure 24:
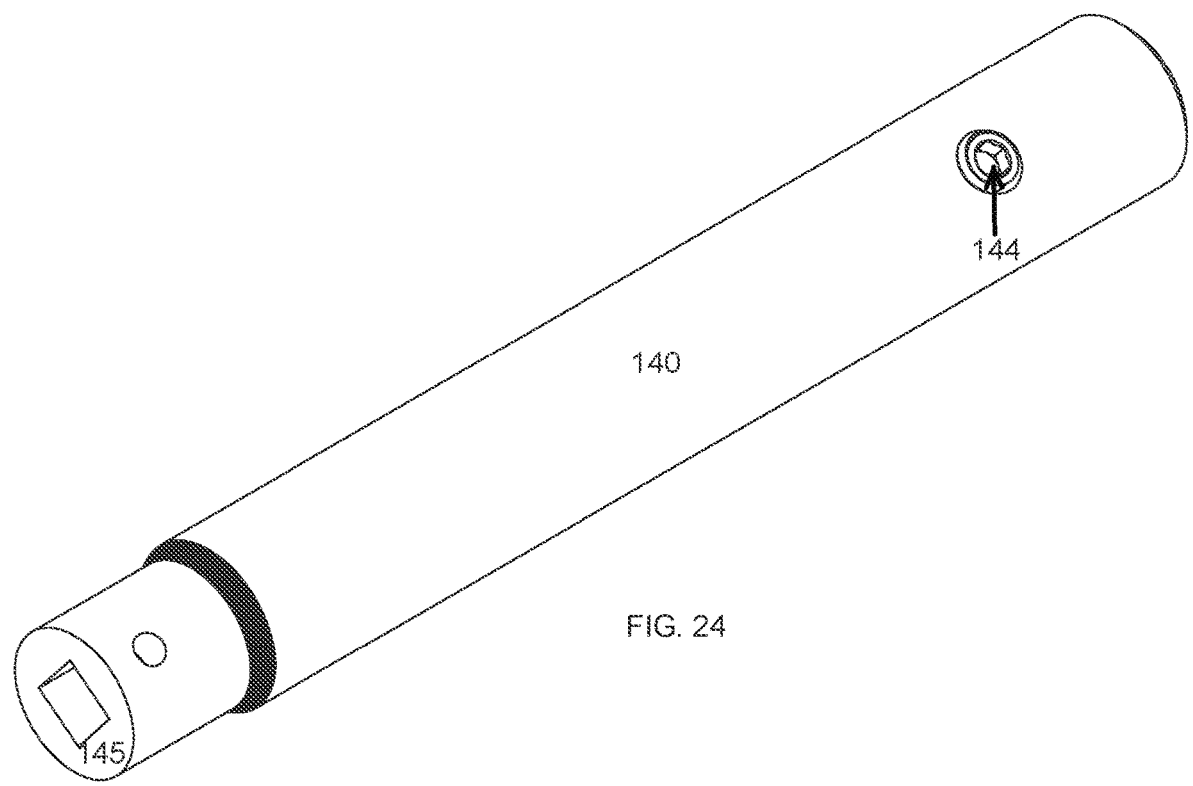

An angled side view of the reamer extension is shown in FIG. 24.

Figure 25:
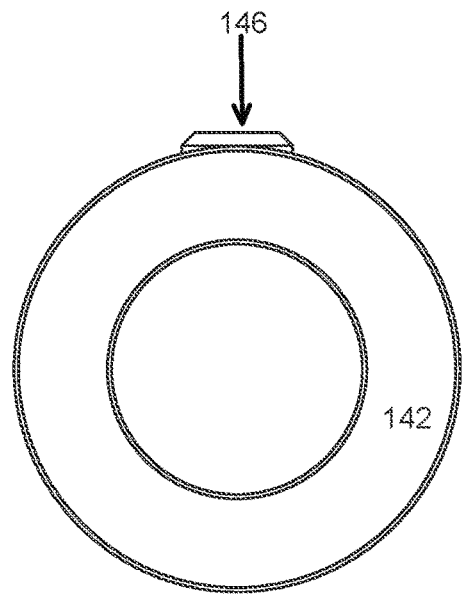
Figure 26:
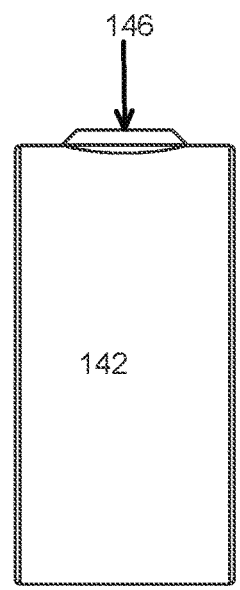

An end view of the reamer stop is shown in FIG. 25, and a side view of the reamer stop is depicted in FIG. 26.

Figure 27:
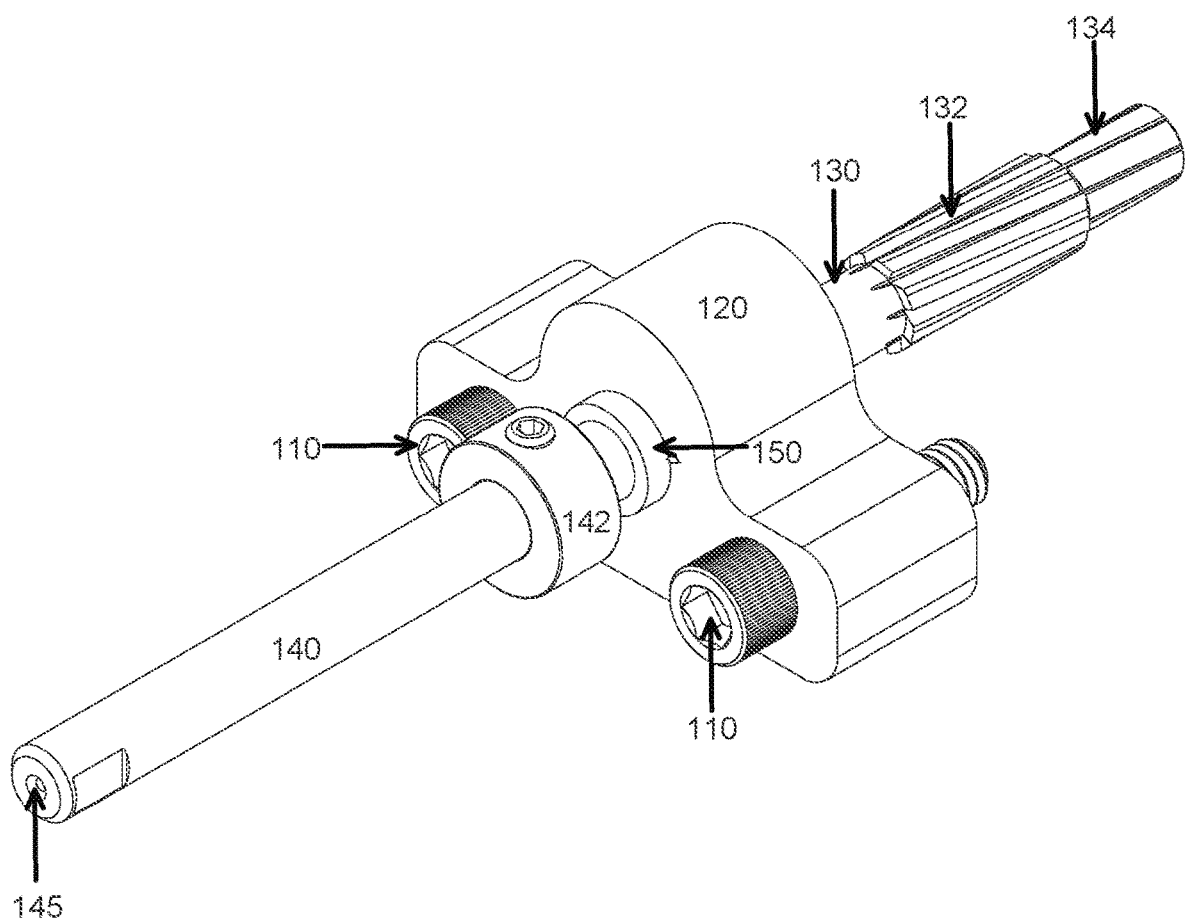

An angled top view of the fully assembled reamer guide block assembly is shown in FIG. 27.

Figure 28:
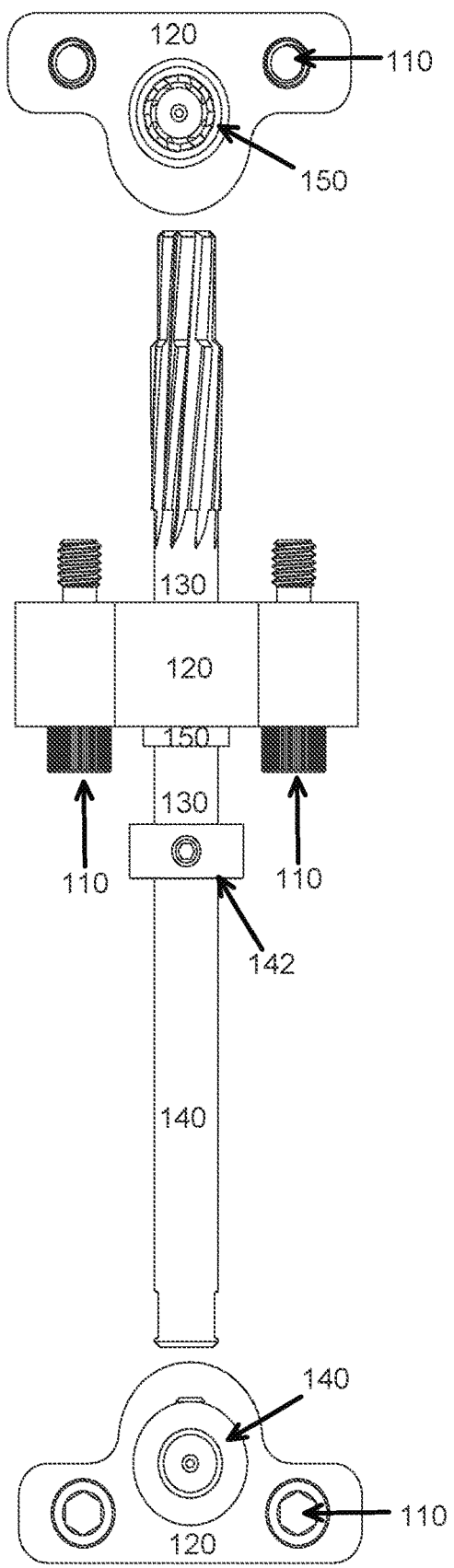

FIG. 28 depicts a top view, and a view of both ends of the fully assembled reamer guide block assembly.

Figure 29:
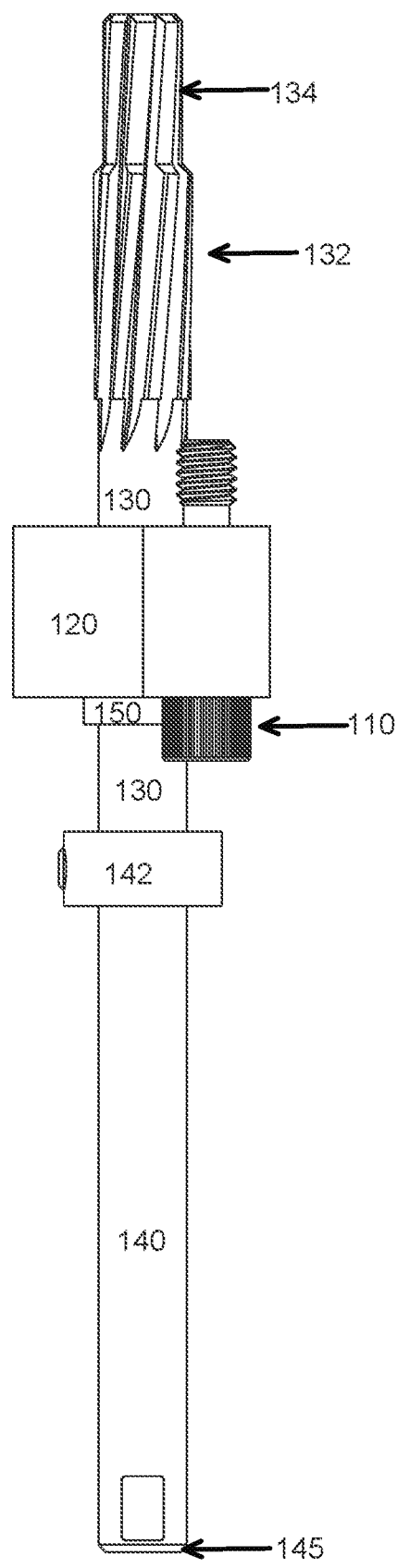

A side view of FIG. 28 is illustrated in FIG. 29.

Figure 30:
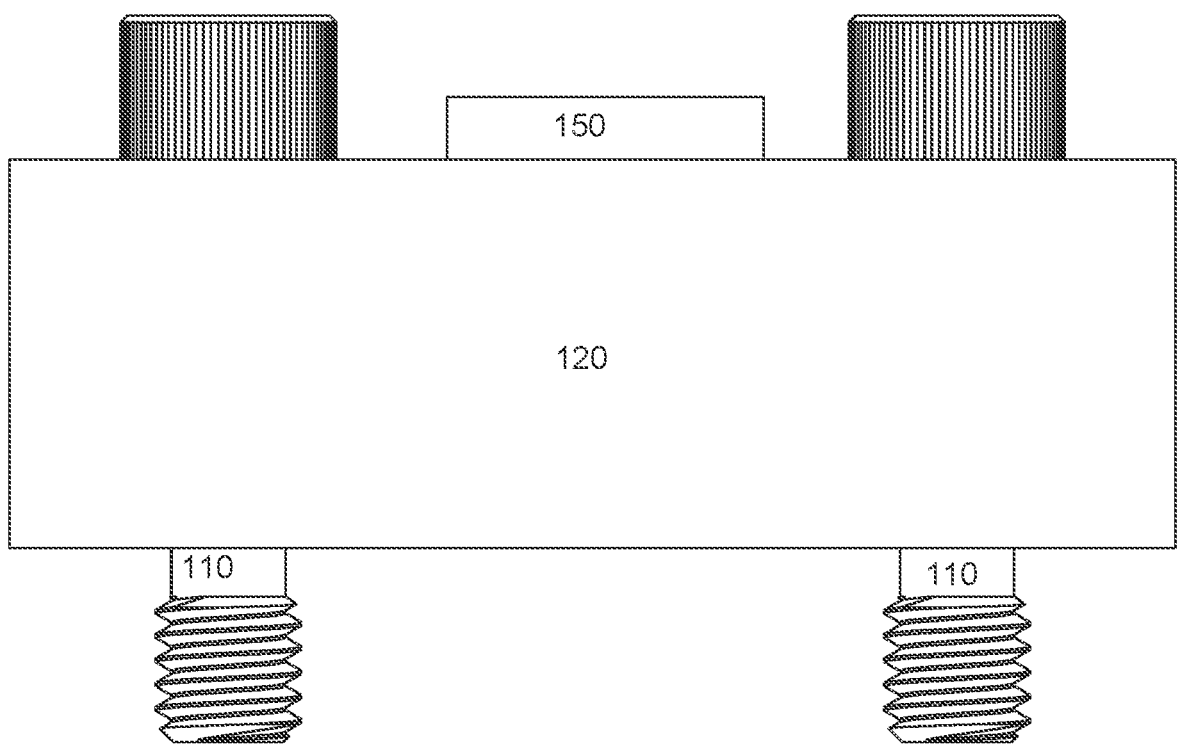

FIG. 30 depicts a side view of the reamer guide block.

Figure 31:
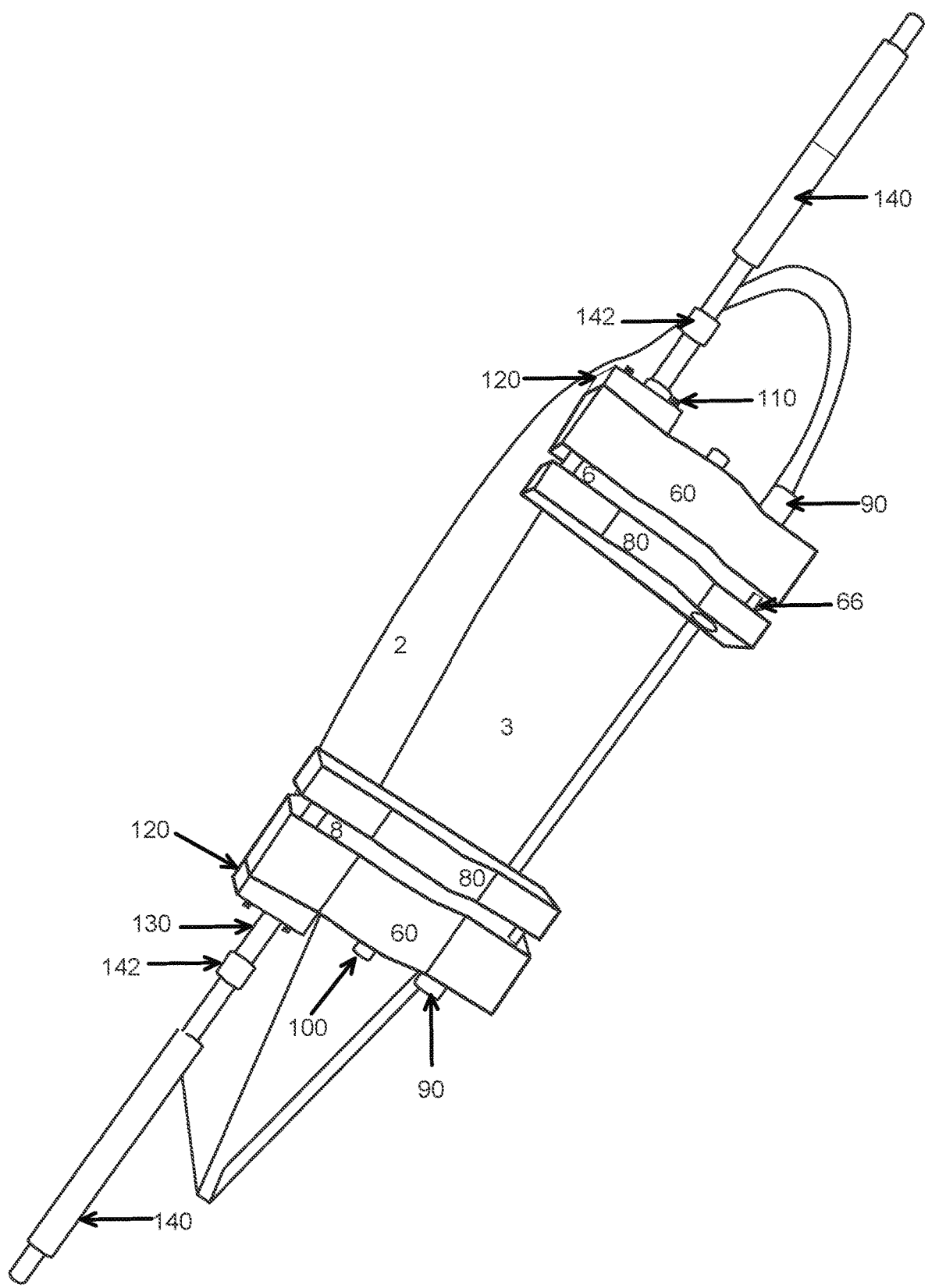

FIG. 31 shows an angled view of the stabilator with two reaming block assemblies and two reamer guide block assemblies attached.

Figure 32:
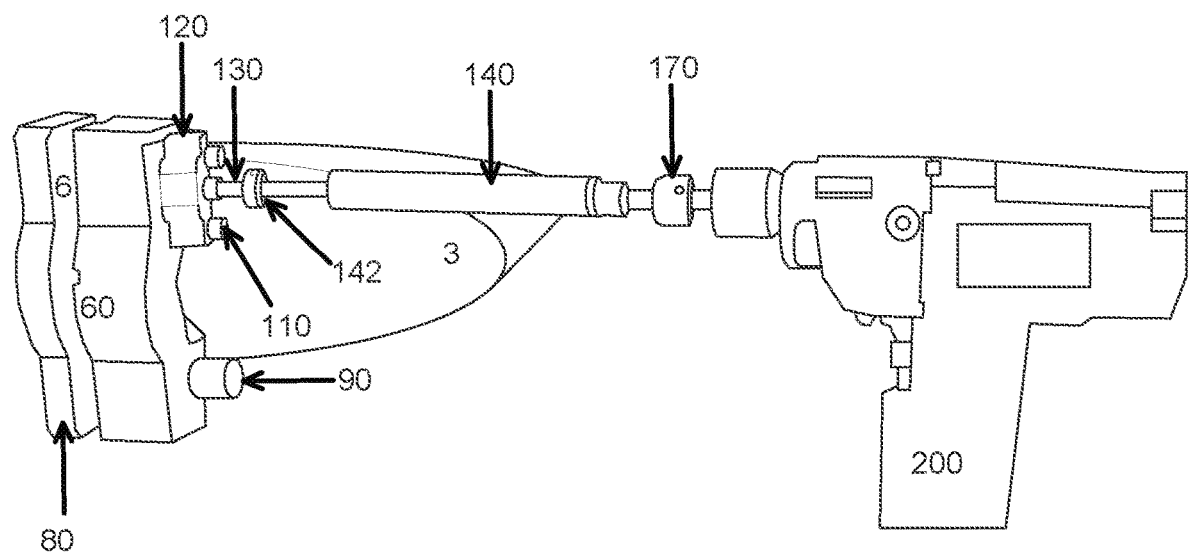

A side view of a single reaming block and a single reamer guide block assembly coupled to a drill is shown in FIG. 32.

Figure 33:
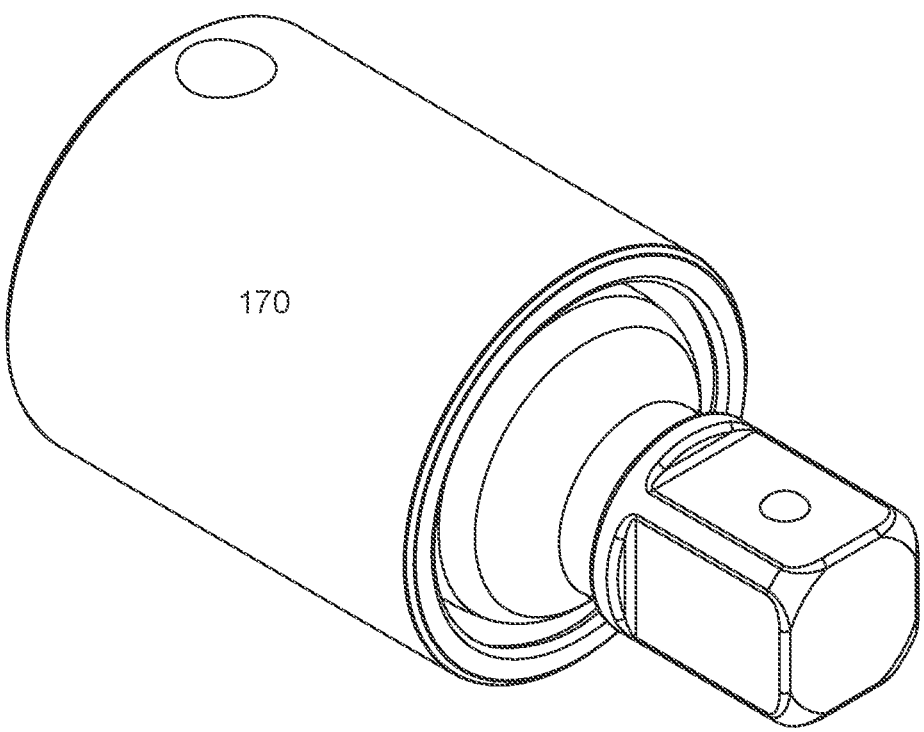

An angled side view of a universal joint is depicted in FIG. 33.

Figure 34:
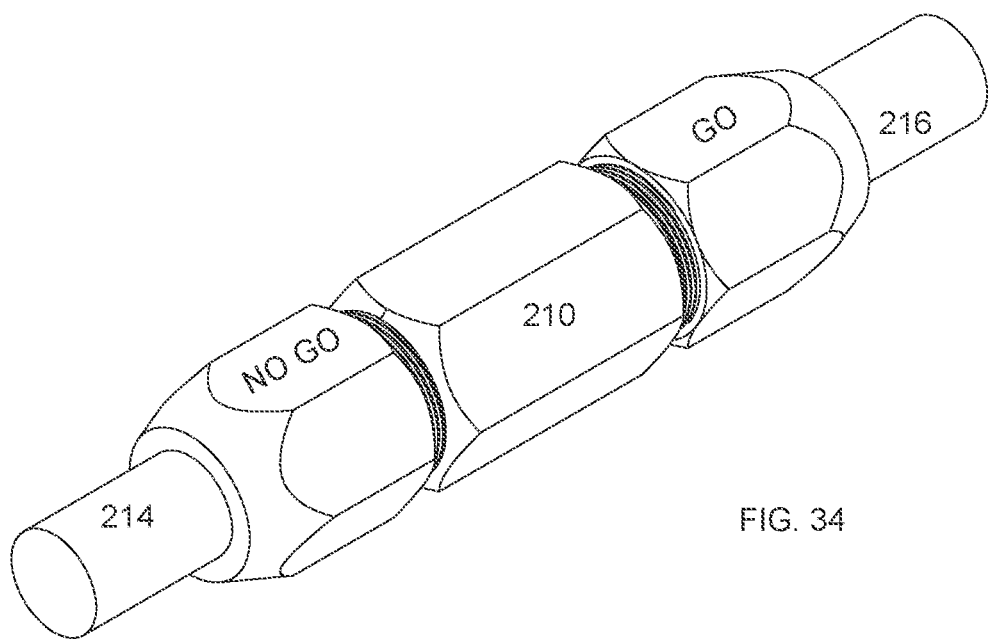
Figure 34B:
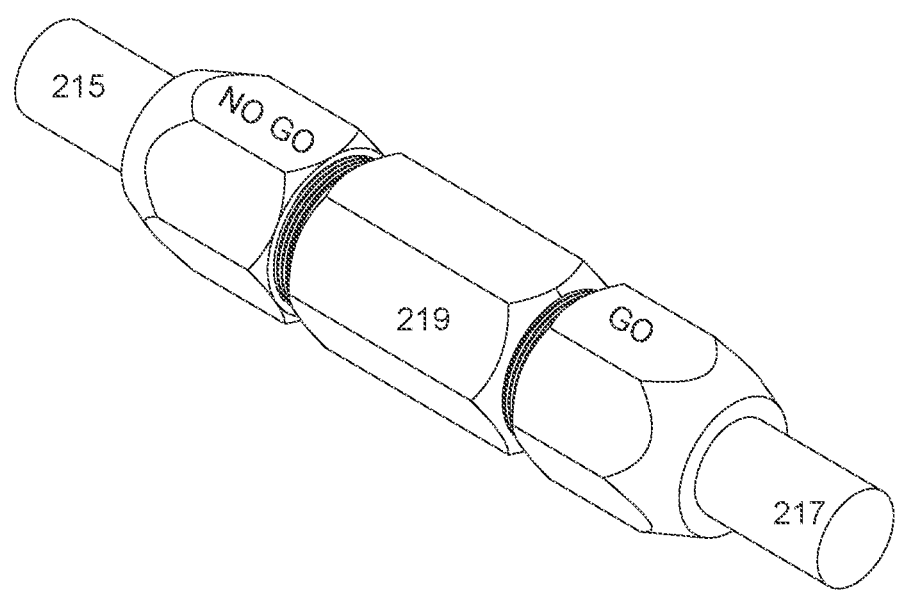

An angled side view of the Aft Go/No Go assembly is shown in FIG. 34. An angled view of the Forward Go/No Go Assembly is shown in FIG. 34B.

Figure 35:
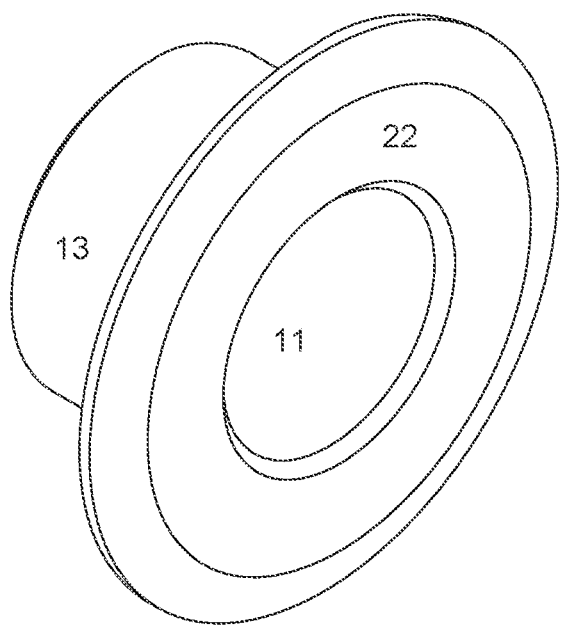
Figure 35B:
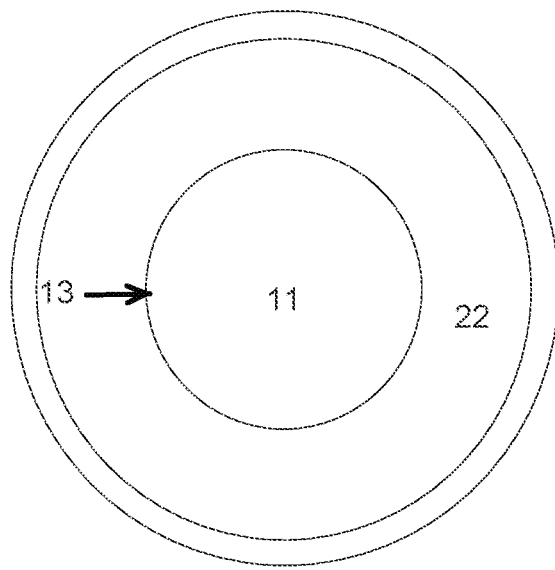
Figure 35C:
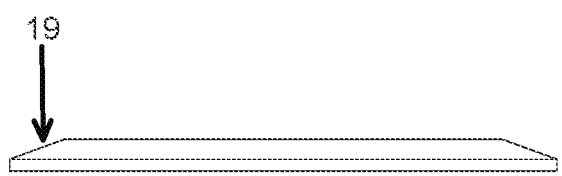

An angled side, front, and side view of the stabilator replacement full bushing is shown in FIGS. 35 and 35B. The replacement washer is shown in FIG. 35C.

Figure 36:
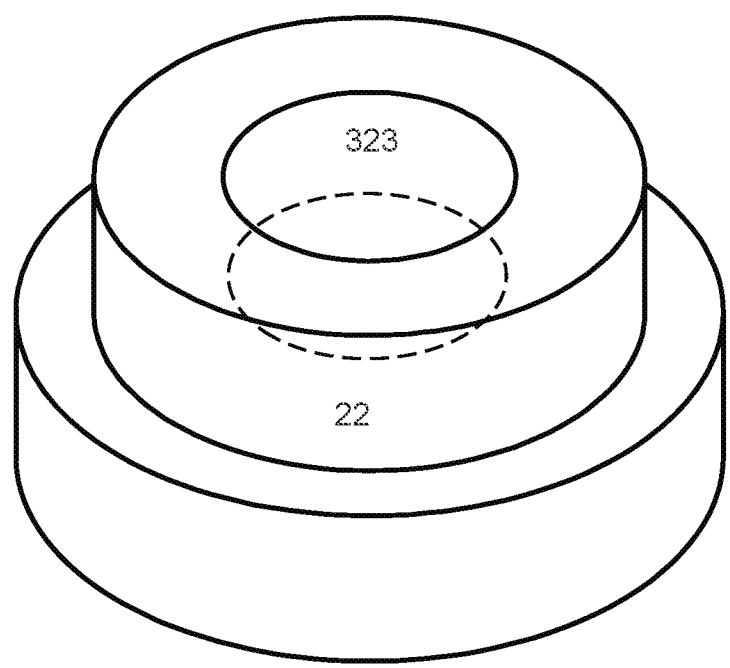

FIG. 36 depicts an angled side view of the aft removal plunger.

Figure 37:
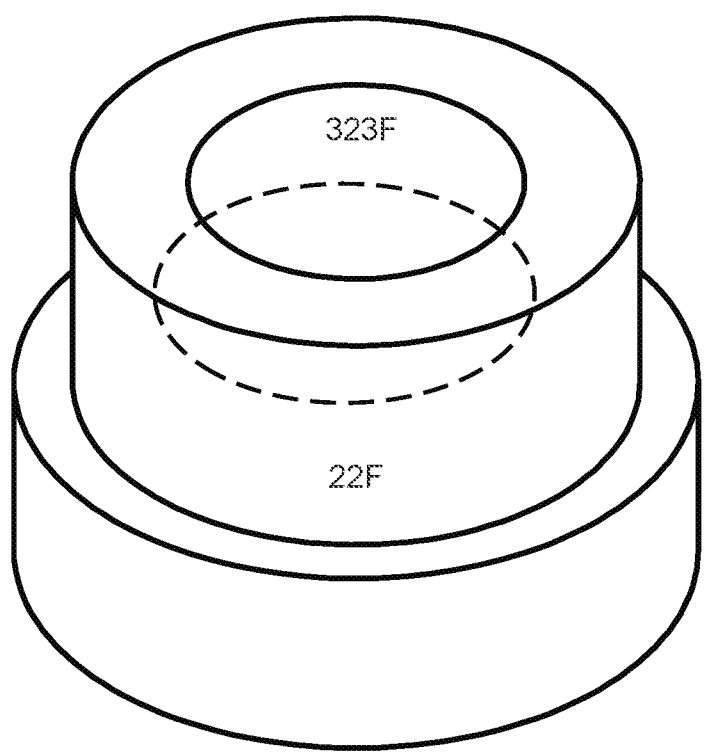

An angled, side view of the forward removal plunger is illustrated in FIG. 37.

Figure 38:
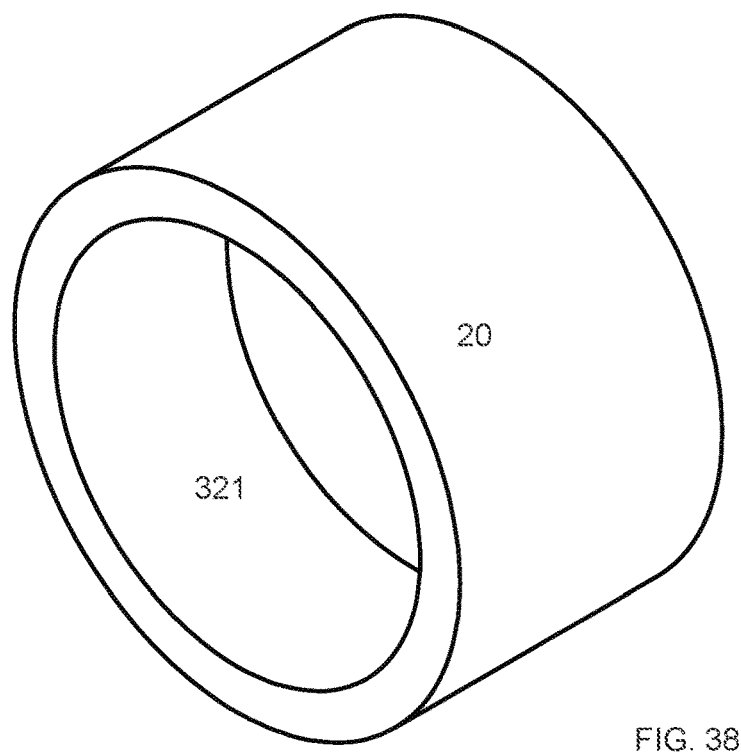

FIG. 38 depicts an angled side view of the spacer cup.

Figure 39:
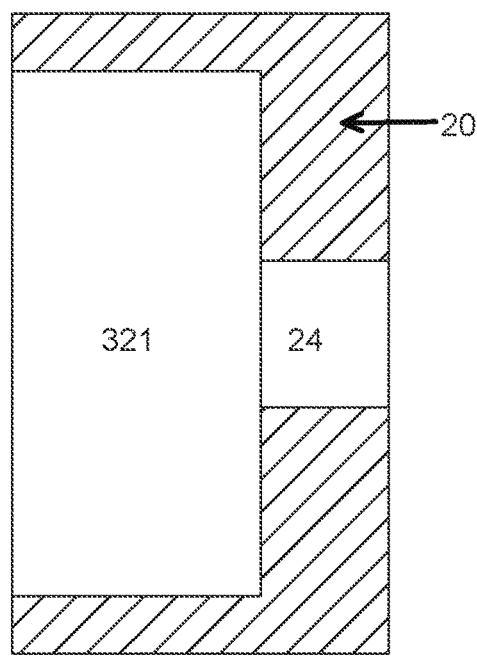

A mid-sectional view of the spacer cup is shown in FIG. 39.

Figure 40:
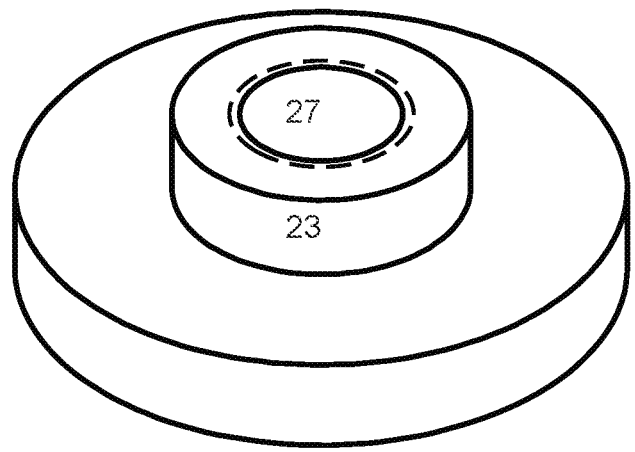

An angled top view of the forward installation anvil is shown in FIG. 40.

Figure 41:
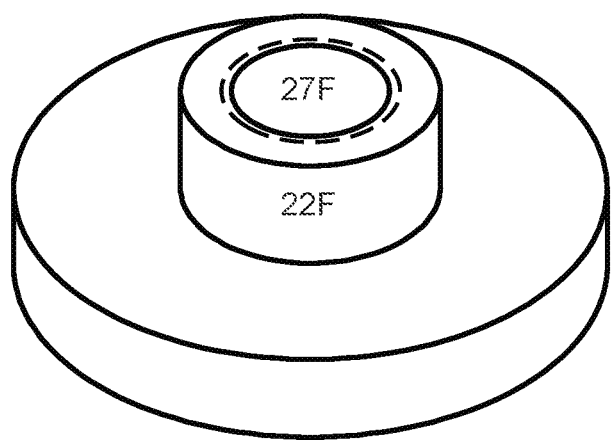

FIG. 41 depicts an angled side view of the aft installation anvil.

Figure 42:
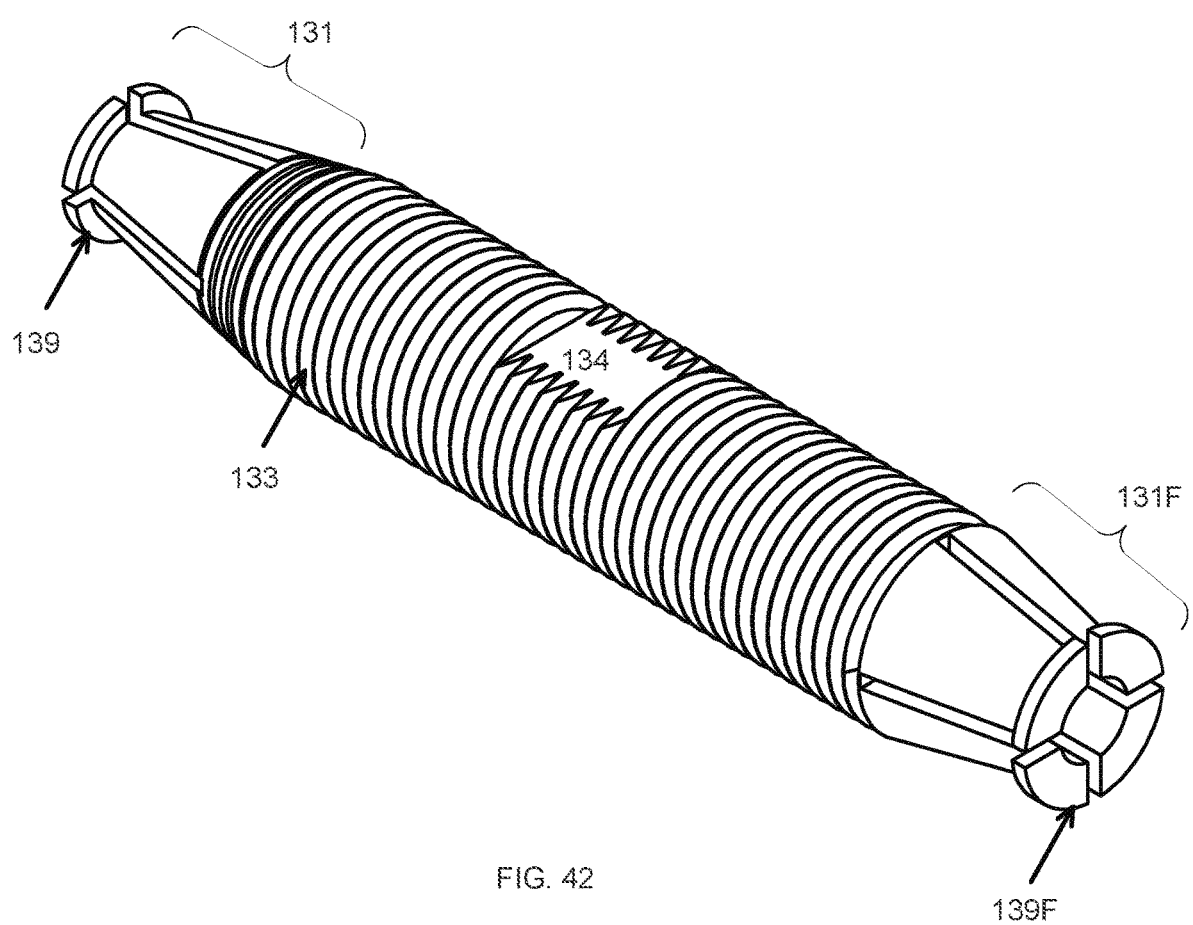

FIG. 42 depicts the forward and aft removal tool.

Figure 43:
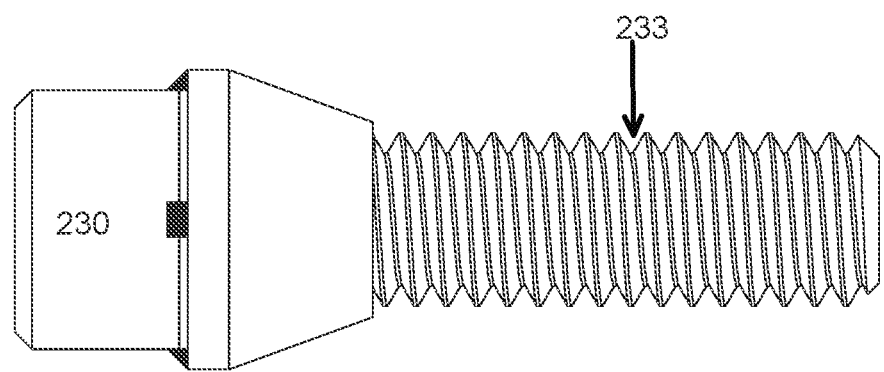

A side view of the forward and aft expansion bolt is illustrated in FIG. 43.

Figure 44:
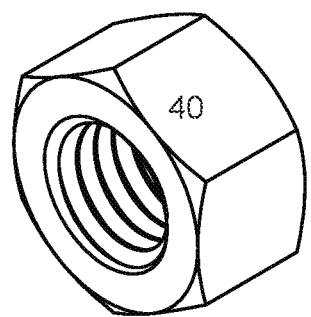

An angled side view of the split bushing removal hex nut is illustrated in FIG. 44.

Figure 45:
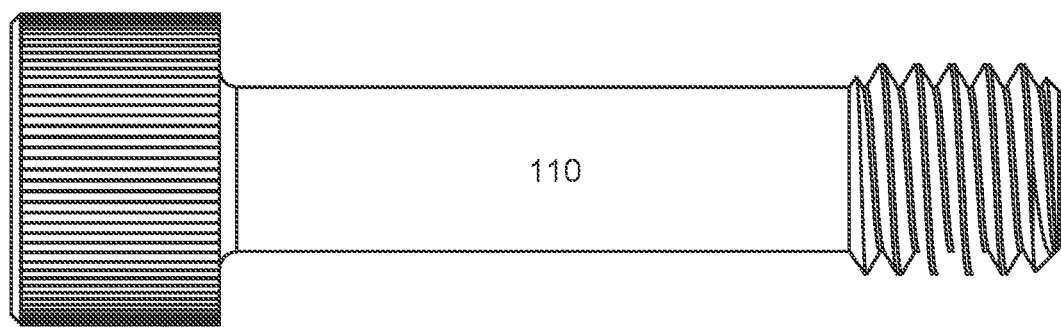

A side view of the captive screw is shown in FIG. 45.

Figure 46:
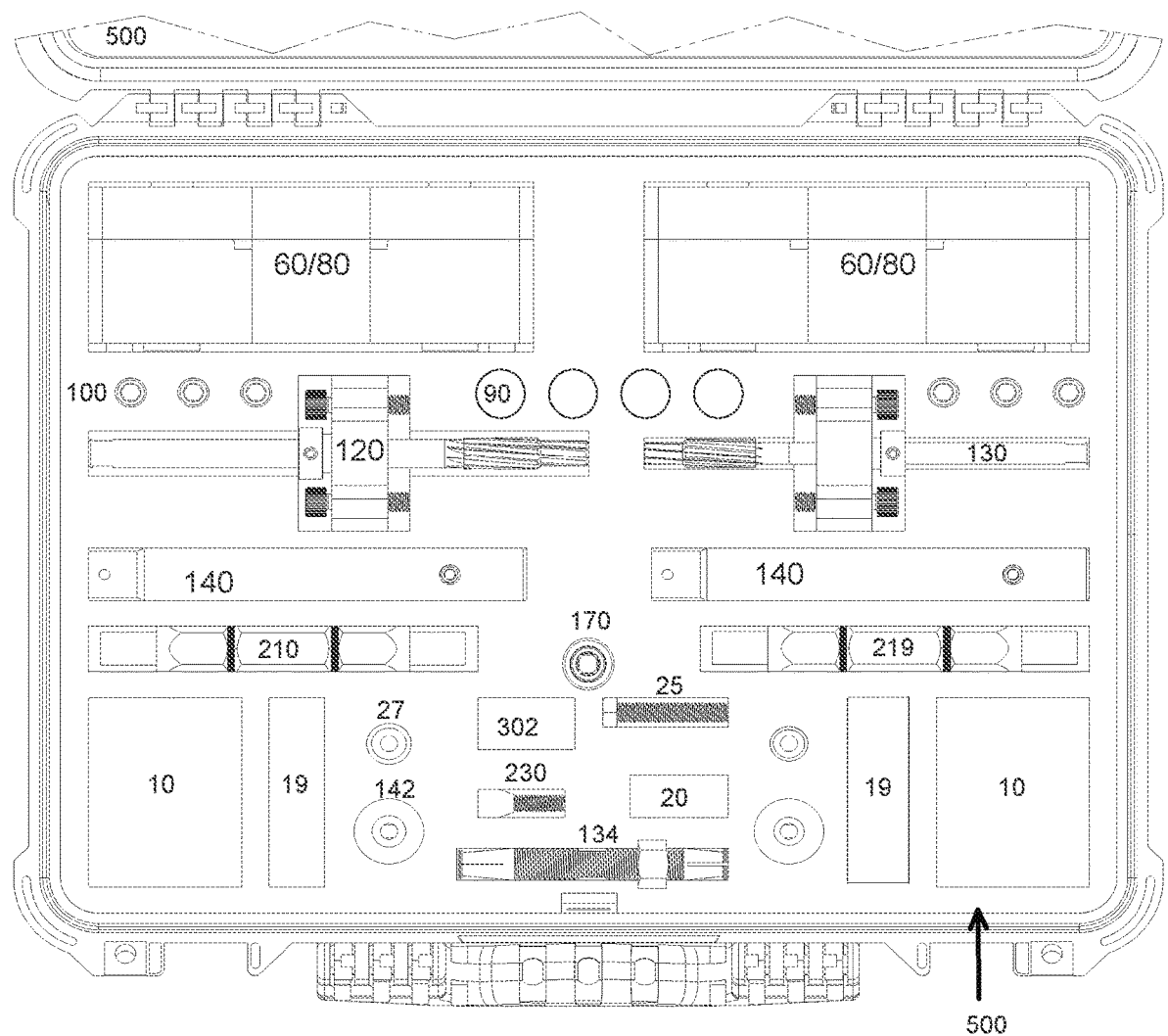

An illustration of the placement of all components of the Black Hawk Bushing Removal and Reamer Device in a carrying case is shown in FIG. 46.

DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

This invention comprises a system and method of replacing Black Hawk helicopter stabilator half and full bushings comprising: removing worn and/or damaged full and split bushings, installation of replacement bushings and bonded washers, and reaming the newly installed bushings to exact tolerances.

Each Black Hawk will have two stabilators, one on each side of the rudder. Each stabilator is bolted onto the rudder via stabilator lugs positioned on the stabilator. The stabilator lugs are lined with metal bushings. Over time, the bushings become damaged and worn, and must be replaced.

Figure 1:
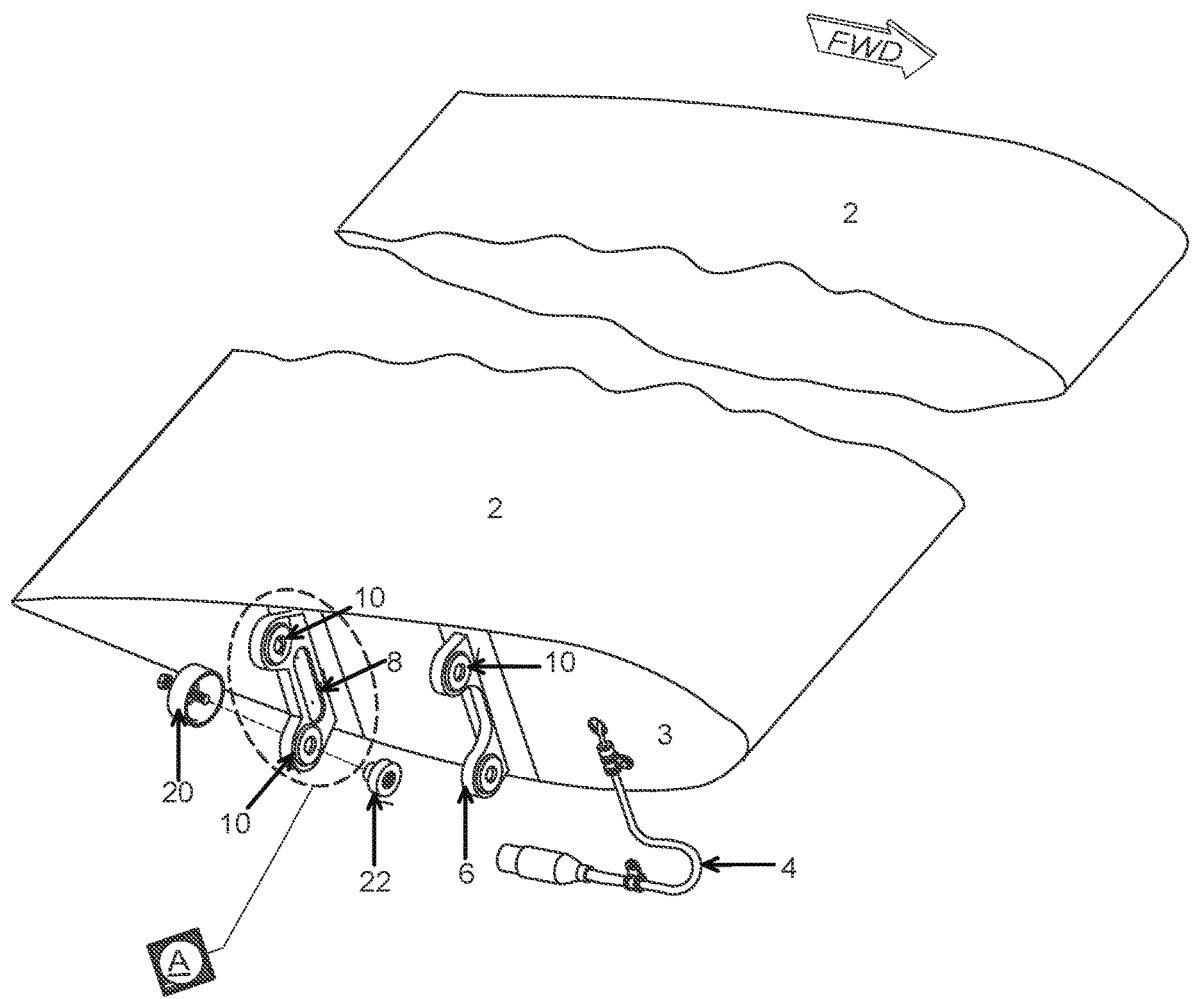
FIGS. 1 through 46 depict the Black Hawk Bushing Removal and Reamer Device. In the Figures.

Black Hawk helicopters are known to utilize both half and full bushings. When stabilator bushings are no longer within allowed tolerances, then they must be removed and replaced with full bushings and bonded washers. If any bushing is out of tolerance, all 4 bushings must be replaced. First, the stabilator must be removed from the Black Hawk. The repairing technician then determines whether split or full bushings are installed on the stabilator. FIG. 1 depicts a top, angled view of the stabilator 2 detached from the Black Hawk so that the bushings are visible. Stabilator 2 is shown bisected. The Forward direction is shown by the "FWD" arrow. The direction opposite the "FWD" arrow is the aft direction. The detached stabilator must be secured to a stable work surface. The work surface may be any table or platform that allows a technician to secure the stabilator so that it does not move during the system and method disclosed herein. The work surface may be any suitable surface, including a suitable service at field-level in maintenance facilities, motor pools, mobile shops, or the tactical environment. This allows maintenance to be conducted throughout field locations and not just at sustainment-level facilities.

Full bushing removal is shown in FIG. 1. Stabilator mounting plate 3 provides a surface to mount forward stabilator lug 6 and aft stabilator lug 8. Forward stabilator lug 6 and aft stabilator lug 8 may have split or full bushings. And the size of the bushings in the forward stabilator lug 6 may be slightly larger than the bushings utilized in the aft stabilator lug 8. Two full bushings 10 are shown installed in forward stabilator lug 6 and aft stabilator lug 8. Electrical connector 4 relates information relating to the altitude of stabilator 2. Spacer cup 20 is shown paired with removal plunger 22 on a full bushing 10 installed in aft stabilator lug 8.

Figure 2:
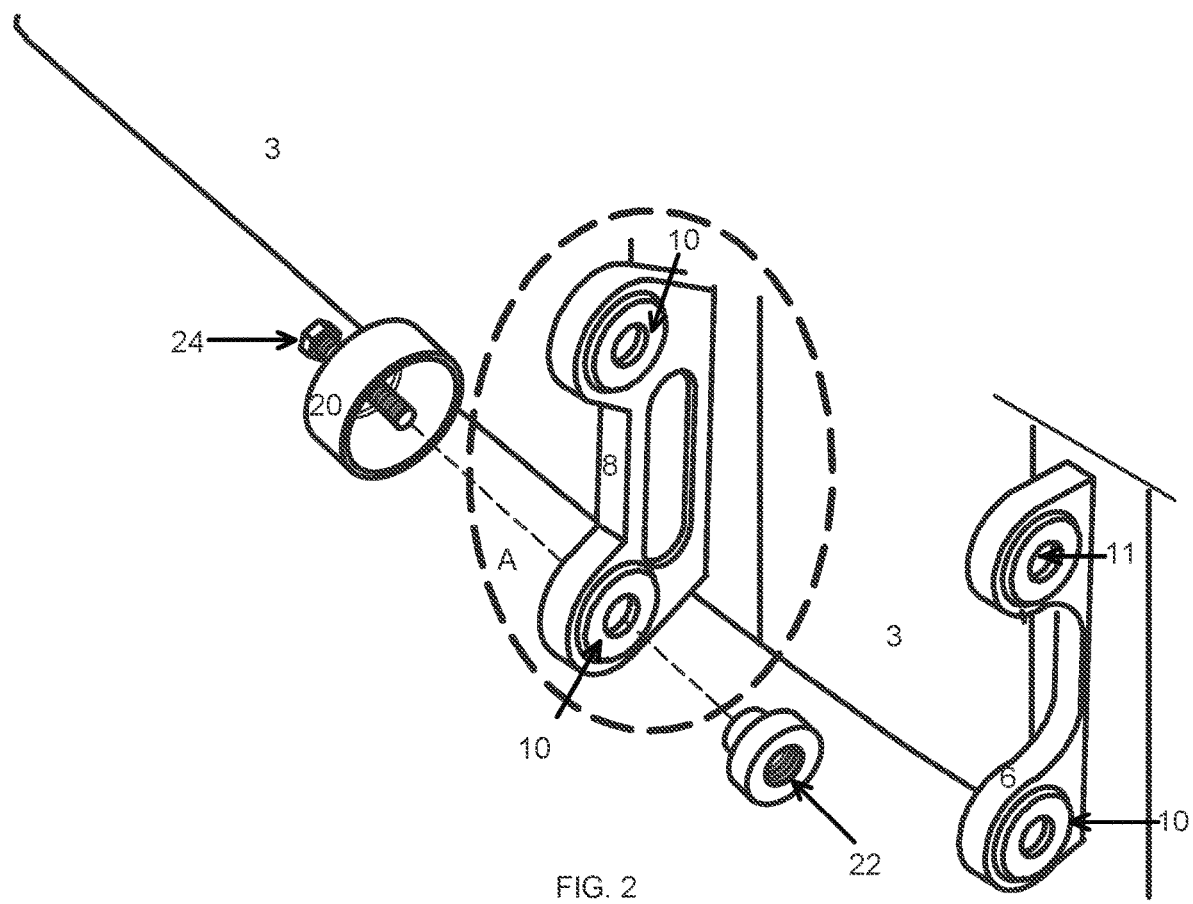

FIG. 2 is an enlarged view of stabilator mounting plate 3 shown in FIG. 1. Full bushings 10 include opening 11 that removal plunger 22 is formed to fit within. A tech slides spacer cup 20 onto removal bolt 24. Removal bolt 24 is then inserted into the aft side of full bushing 10. Removal plunger 24 is positioned on the forward side of full bushing 10. Removal bolt 24 is threaded into removal plunger 22 through from the aft side. Once the open end of spacer cup 20 is seated flat against aft stabilator lug 8, a tech hand tightens removal bolt 24 into removal plunger 22. Removal bolt 24 is tightened until full bushing 10 falls loose into spacer cup 20.

Figure 3:
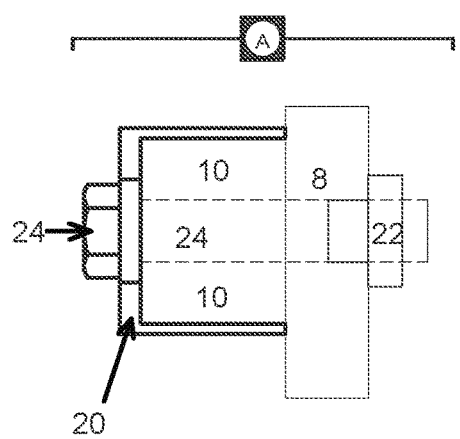

FIG. 3 depicts a mid-sectional view of the spacer cup 20 positioned onto aft stabilator lug 8. Removal bolt 24 is pushed tightly against spacer cup 20 and traverses spacer cup 20 and screws into removal plunger 22. Screwing removal bolt 24 into removal plunger 22 pulls bushing 10 out of aft stabilator lug 8 removing full bushing 10 from aft stabilator lug 8 so that spacer cup 20 catches the removed full bushing 10.

Figure 4:
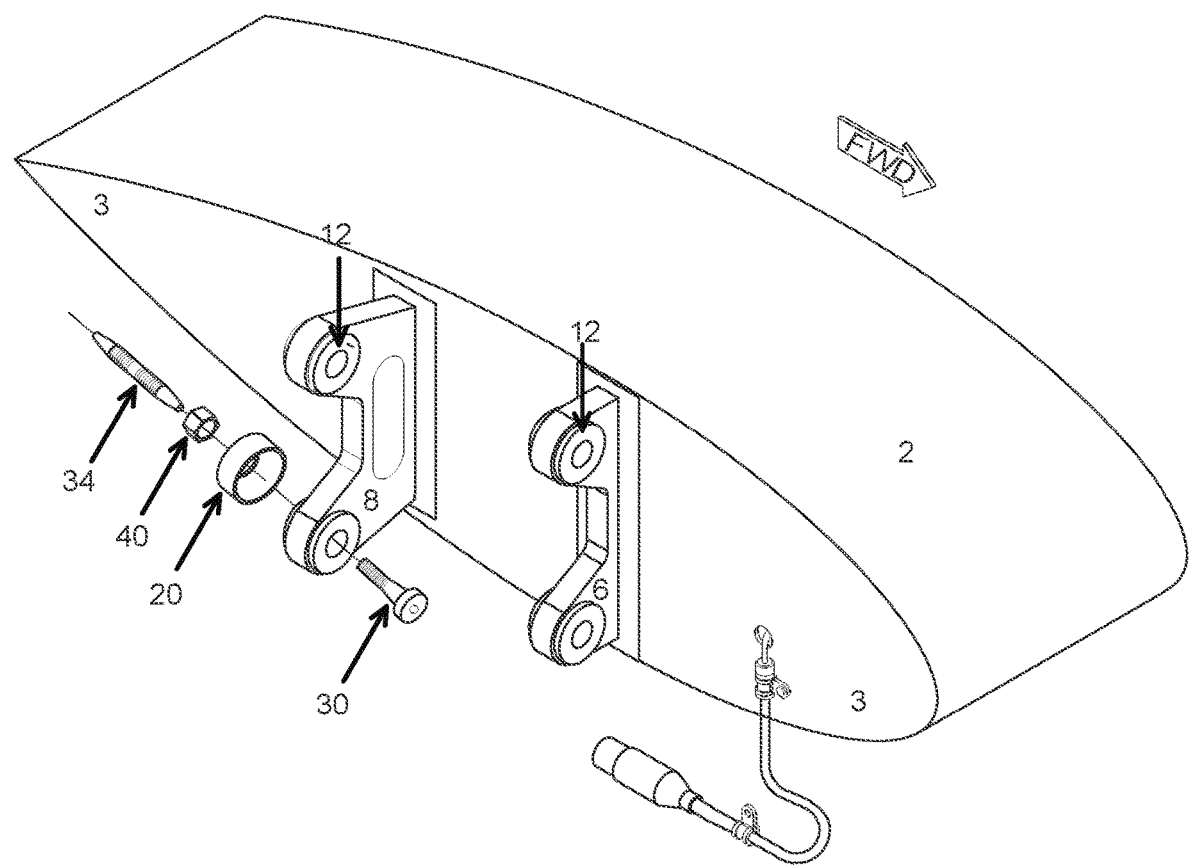
Figure 5:
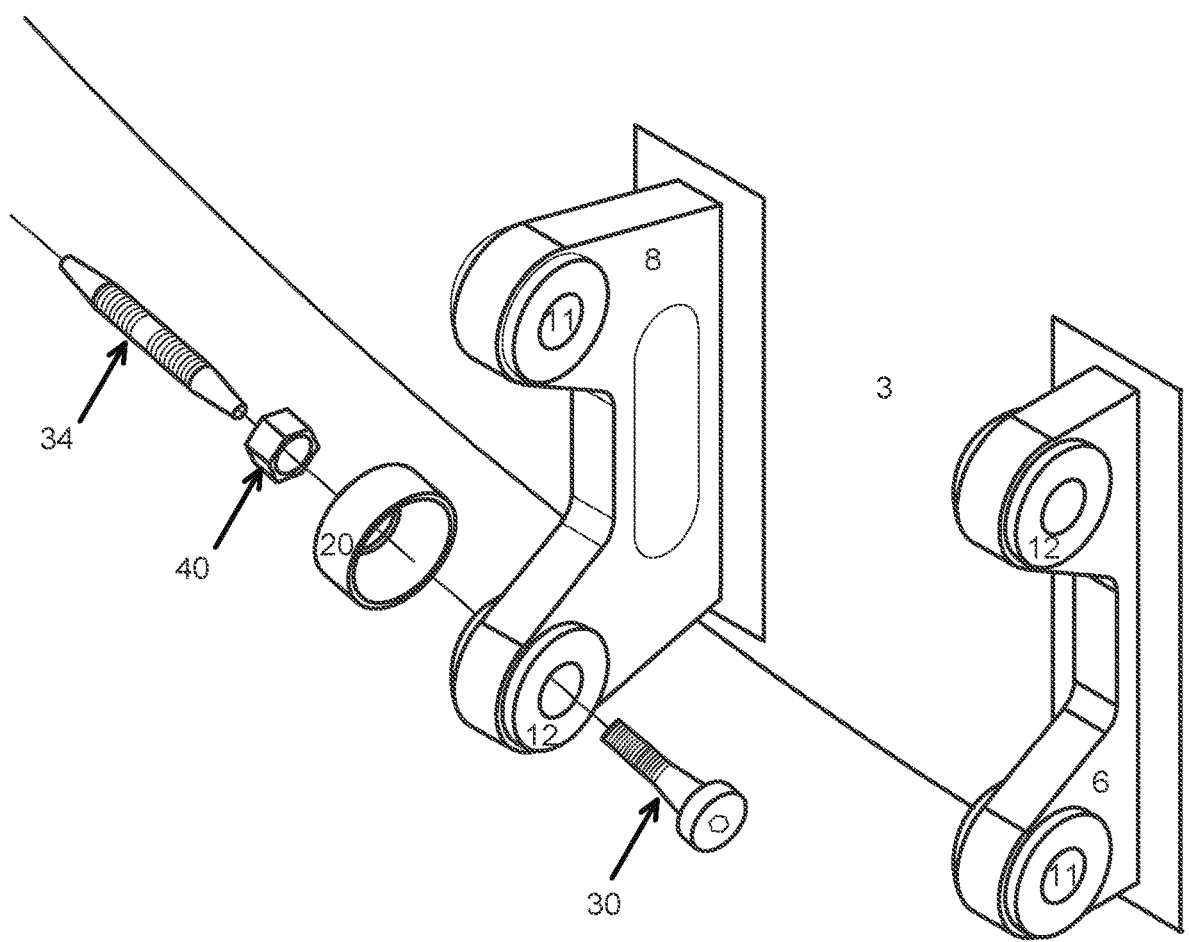

The removal of the half or split bushing 12 from the Black Hawk stabilator 2 is depicted in FIGS. 4 and 5. Forward stabilator lug 6 and aft stabilator lug 8 may be welded onto stabilator mounting plate 3. Each lug includes two split bushings 12 for a total of four split bushings 12. A technician installs hex nut 40 onto threaded puller 34. Spacer cup 20 is slide onto threaded puller 34 on the open end facing split bushing 12. The slotted end of threaded puller 34 is placed into split bushing 12. Expansion tip 30 is placed into the end of threaded puller 34 and tightened to spread the tabs of split bushing 12. The tech holds threaded puller 34 and tightens hex nut 40 from removal side until split bushing 12 falls loose into spacer cup.

FIG. 5 depicts an exploded view of split bushing 12 removal. Expansion tip 30 is inserted into bushing opening 11 so that expansion tip 30 traverses aft stabilator lug 8 and spacer cup 20. Hex nut 40 must be screwed onto threaded puller 34.

Figure 6:
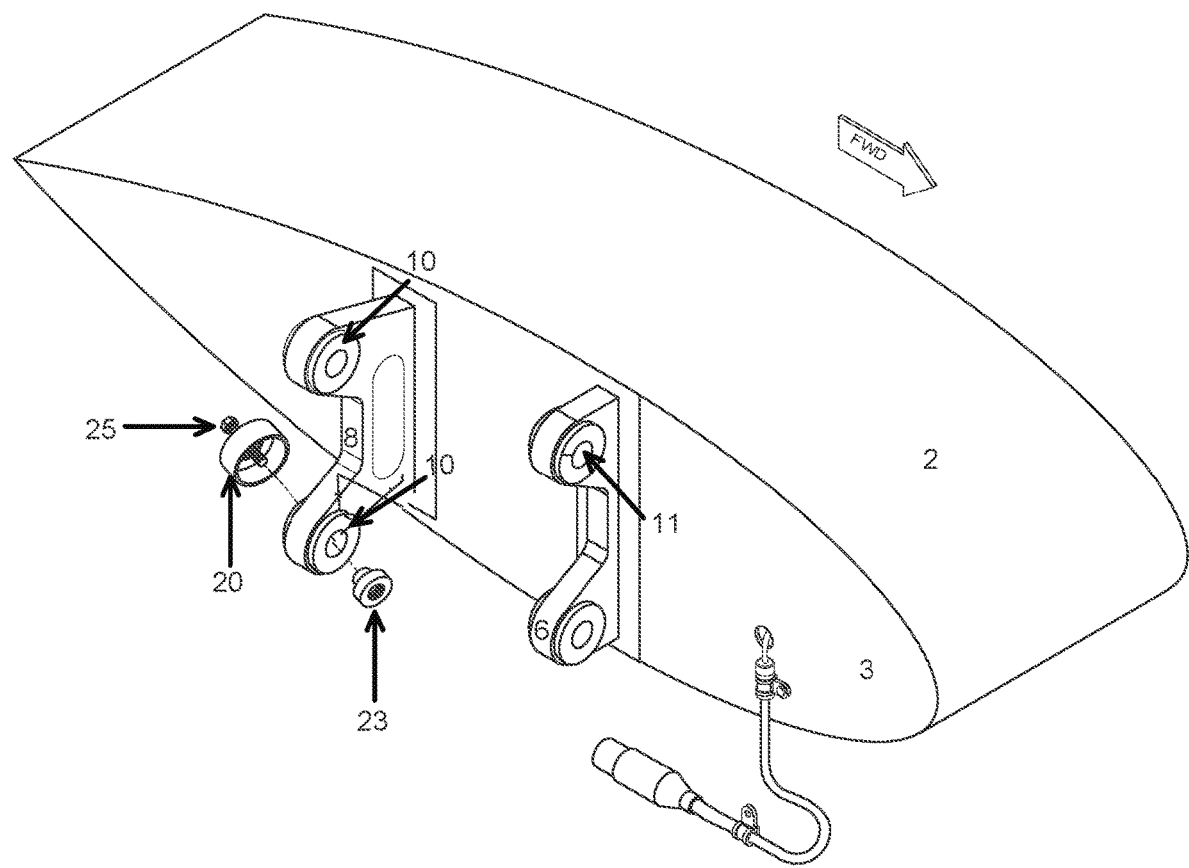
Figure 7:
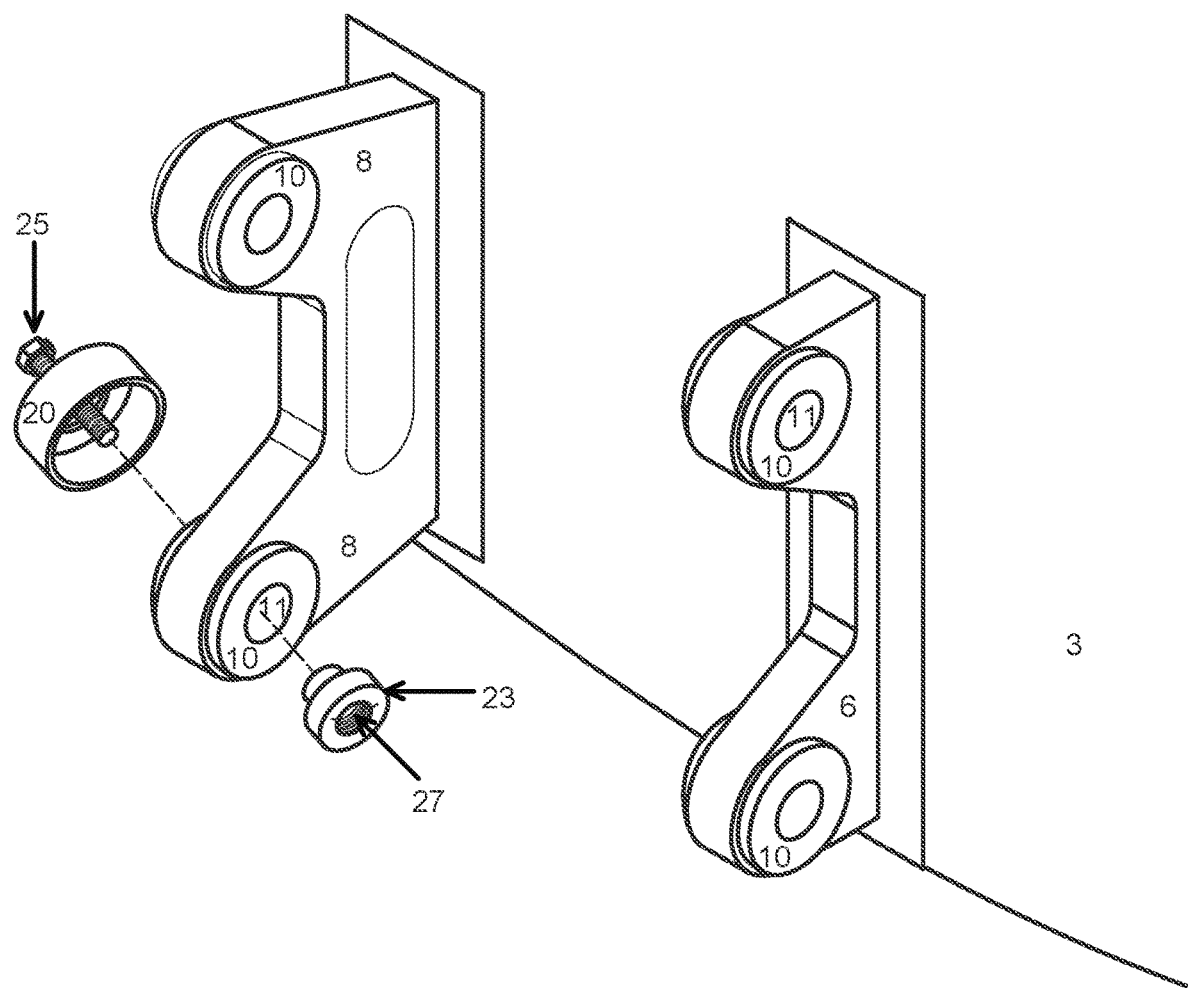
Figure 8:
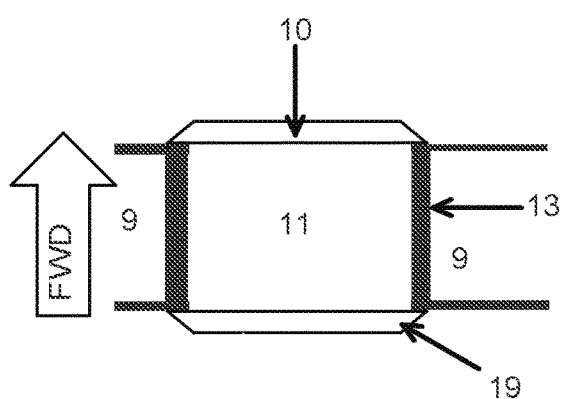
Figure 9:
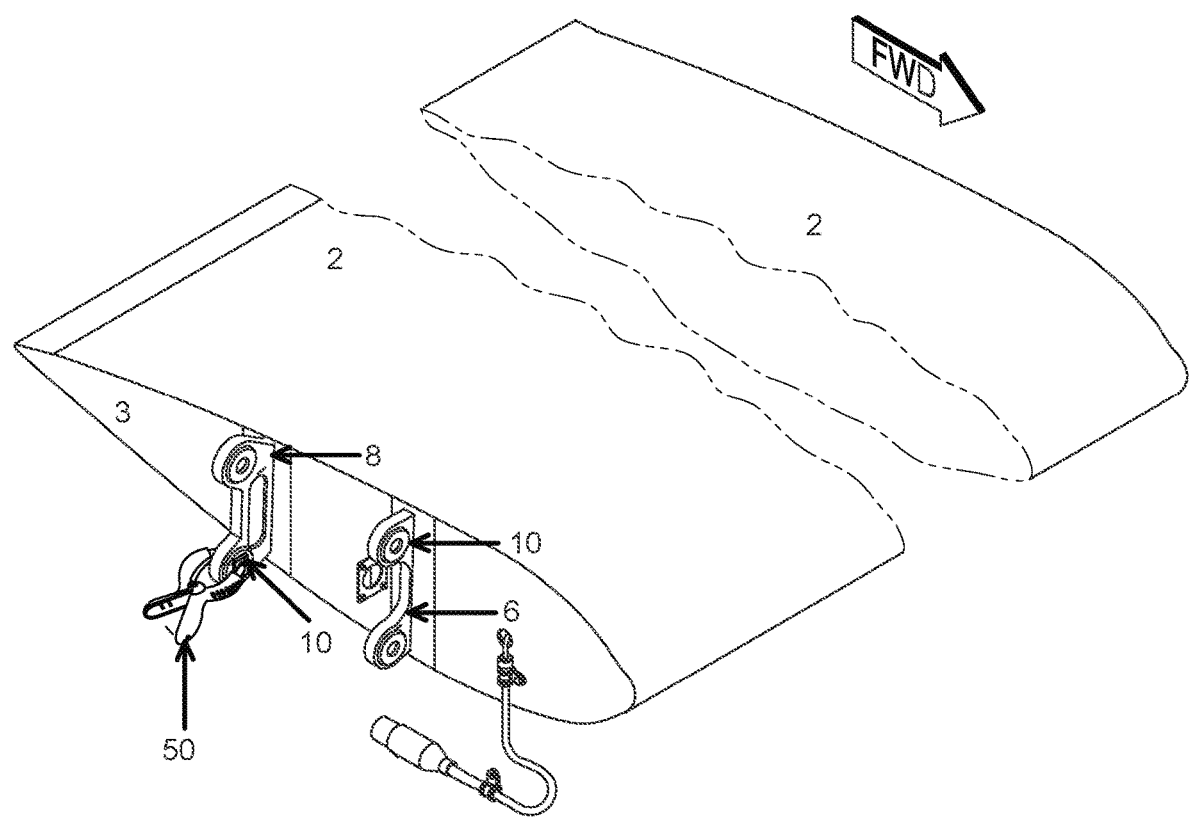
Figure 10:
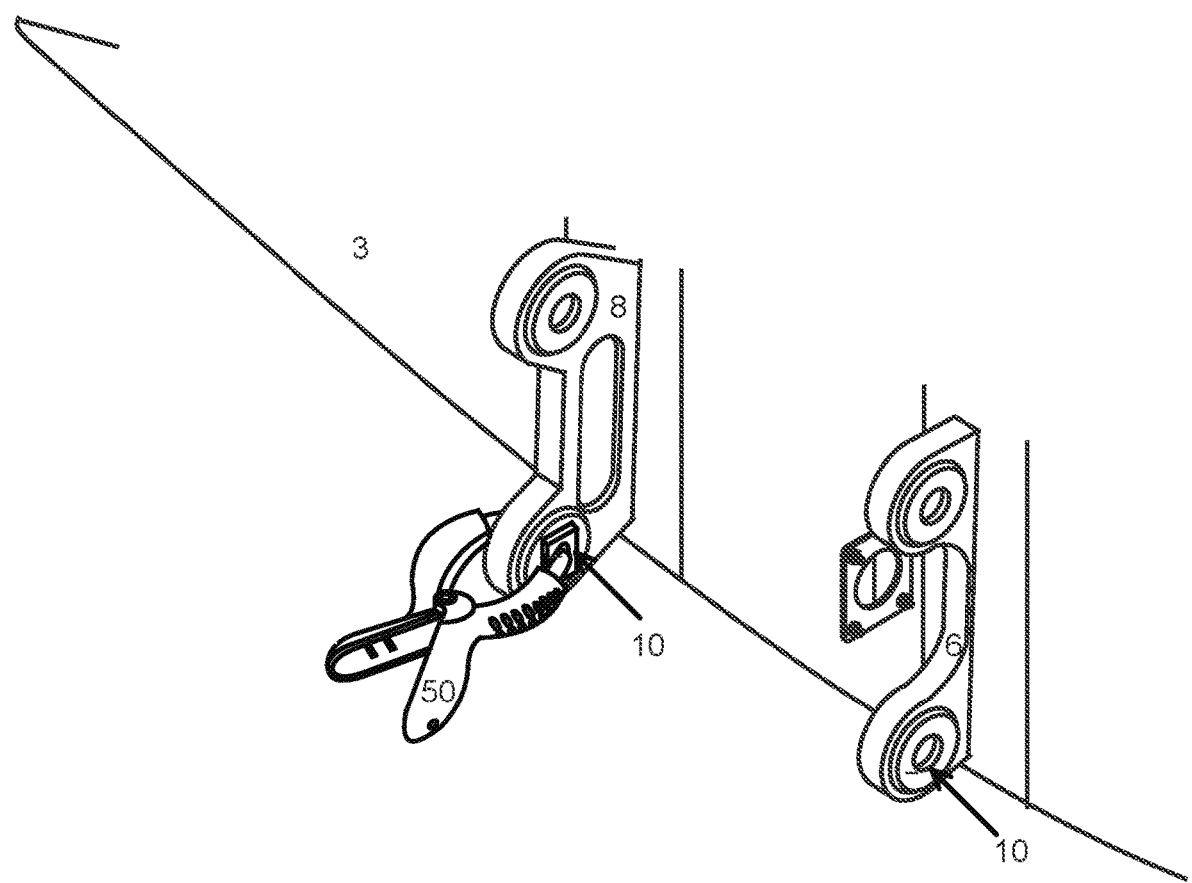

FIGS. 6 and 7 illustrate the installation of a new full bushing 10. A total of four will be installed. FIG. 8 illustrates an exploded view of a newly installed full bushing 10.

Both full bushing 10 and the lug bore (openings of stabilator lugs upon removal of damaged bushings not shown) are cleaned by a technician. Next, the tech applies epoxy to the lug bore. Then tech positions installation anvil 23 into full bushing 10 via installation anvil threads 27 on the brim and lined up with lug bore on aft stabilator lug 8. Installation bolt 25 is positioned into spacer cup 20 and inserted into the lug bore and threaded onto installation anvil 23 and full bushing 10. Installation bolt 25 is tightened until full bushing 10 is flush onto aft stabilator lug 8 and epoxy squeezes out of the lug bore.

FIG. 8 depicts a properly positioned full bushing 10 in lug bore 9. Full bushing 10 is flush against the exterior surface of lug bore 9, bushing opening 11 is formed by the side walls 13 of full bushing 10. Lug washer 19 is positioned on the aft side of lug bore 9, located on the aft side of aft stabilator lug 8.

The tech then applies an even coat of adhesive to lug washer 19 so that it adheres to the surface of aft stabilator lug 8 near lug bore 9. Pressure is applied for approximately 12 hours via spring clamp 50 that lug washer 19 is secured onto aft stabilator lug 8 near lug bore 9. This step is repeated for each of the three remaining lug washers 19 on the Black Hawk stabilator 2. A glued washer lacks the stability and tolerances required to maintain full bushing 10 in the correct position during operation of the Black Hawk helicopter. Lug Washer 19 must be reamed onto the aft side of aft stabilator lug 8 to secure full bushing 10 into position on aft stabilizer lug 8.

The reaming device and method is illustrated in FIGS. 11 through 52B. FIG. 11 depicts the reaming block assembly installed upon stabilator 2 at stabilator mounting plate 3, wherein the reaming block assembly is locked onto both forward stabilator lug 6 and aft stabilator lug 8. The reaming block assembly includes two outer reaming blocks 60 and two inner reaming blocks 80. FIG. 11 illustrates an outer reaming block 60 is coupled to an inner reaming block 80 via two guide pins 66, two alignment pins 90 and an alignment bolt 100. The tech places an outer reaming block 60 on the outer surface of the aft stabilator lug 8, and aligns an inner reaming block 80 on the inner surface of the aft stabilator lug 8. Next, the two guide pins of the inner reaming block 80 are positioned into openings formed in outer reaming block 60 pushing the inner reaming block into contact with the inner reaming block 80. Alignment pins 90 and alignment bolt 100 are positioned into openings formed in outer reaming block 60 and inner reaming block 80 coupling the two reaming blocks together.

FIG. 12 shows the interior side A (side that mates with inner reaming block 80) of outer reaming block 60. Each of the two channel 70 receives an alignment pin 90. Middle channel 78 receives an alignment bolt 100, and each lower channel 76 receives an alignment bolt 100. Contact block surface 72 makes contact with the interior surface of inner reaming block 80. Channels 69 are the correct size to receive guide pin 66, that is formed onto the interior surface D of inner reaming block 80. Guide pin 66 keep inner reaming block 80 and outer reaming block 60 in alignment with each other.

Dimension lines have been added to FIG. 12 in FIG. 12A. Line X has been drawn from a point that is the center, or the point equidistant from the points on the edge of middle channel 78. Line X is positioned at a point that is one-half the length of outer reaming block 60. Line X is projected through, above, and below outer reaming block 60. Line ZA1 extends from a point that is the center, or the point equidistant from the points on the edge of channel 70. Line ZA2 extends from the point that is equidistant from the points on the edge of channel 70. E1 is the distance from Line ZA1 to Line X, and E2 is the distance from Line ZA2 to Line X. E1 is the same length as E2. In one embodiment E1 and E2 are both 2.500 inches.

Line ZB1 extends from a point that is the center, or the point equidistant from the points on the edge, of lower channel 76, while Line ZB2 extends from a point that is the center of lower channel 76. Distance C1 equals the length from Line ZB1 to Line X. Distance C2 equals the length from Line ZB2 to Line X. Distance C1 equals Distance C2. In one embodiment, C1 and C2 may be 3.500 inches.

Line Y1 extends from a point that is the center of channel 69, which is the point equidistant from the points on the edge of channel 69. Line Y2 extends from the point that is equidistant from the points on the edge of channel 69. Distance D1 is the distance from Line Y1 to Line X, while D2 is the distance from Line Y2 to Line X. D1 is the same distance as D2. In one embodiment, D1 and D2 may be 3.437 inches.

The positioning of ZA1 and ZA2 equidistance from Line X, the positioning of ZB1 and ZB2 equidistance from Line X, and the positioning of Y1 and Y2 equidistance from Line X allows exact tolerances to be maintained while reaming a helicopter stabilator lug bushing.

The exterior side B (opposite side A of inner reaming block 80) of outer reaming block 60 is depicted in FIG. 13. Cavity 74 is formed to accept the large head of alignment pin 90 securing it into outer reaming block 60. Channel 69 is formed into outer reaming block 60 with opening 67 that allows guide pin 66 to fully traverse outer reaming block 60. Channels 76 and 78 fully traverse outer reaming block 60. Channels 75 allow outer reaming block 60 to be coupled to a reamer guide lock 120.

FIG. 13A depicts the exterior side B of inner reaming block 80 with dimension lines added. Line X has been drawn from a point that is the center of channel 78, which is the point equidistant from the points on the edge of middle channel 78, and is positioned at a point that is one-half the length of outer reaming block 60. Line X is projected through, above, and below outer reaming block 60. Y1, Y2, D1, D2, ZB1, ZB2, C1, and C2 are the same in FIG. 13A as they are in FIG. 13. Line P1 is extends from a point that is the center of channel 75, which is the point that is equidistant from the points on the edge of channel 75. Distance G1 is the distance from Line X to Line P1. Line P2 extends from a point that is equidistant from the points on the edge of channel 75. Distance G2 is the distance from Line X to Line P2. Distance G1 equals Distance G2. In one embodiment, G1 and G2 may be 1.562 inches.

Line Q1 extends from a point that is the center of cavity 74, or the point that is equidistant from the points on the edge of cavity 74. Distance F1 is the distance from Line Q1 to Line X. Line Q2 extends from a point that is equidistance from the points on the edge of cavity 74. Line Q2 is Distance F2 from Line X. Distance F1 equals Distance F2. In one embodiment, F1 and F2 may be 2.500 inches.

A mid-sectional view of outer reaming block 60 is shown in FIG. 14. Alignment pin 90 fits securely into cavity 74 and channel 70. Channel 75 is formed to accept coupling with reamer guide lock 120. Channel 69 accepts guide pin 66 of inner reaming block 80, while lower channel 76 is formed to accept alignment bolt 100 in order to couple to inner reaming block 80.

An angled, exterior view of inner reaming block 80 is shown in FIG. 15, while a side view is shown in FIG. 16. The exterior surface C of inner reaming block 80 is positioned on the reaming block assembly so that it faces the middle region of stabilator mounting plate 3, while interior surface D couples to outer reaming block 60. Channels 82 are formed to accept the small end of alignment pin 90. Coupling pins 66 are formed onto inner reaming block 80. Channels 86 and 88 are formed into inner reaming block 80 to accept alignment bolts 100.

Line L extends from a point that is equidistant from the points on the edge of channel 88. Line L is positioned at a point that is one-half the length of inner reaming block 80. Line M1 extends from a point that is equidistant from the points on the edge of guide pin opening 65. Distance S1 is the distance from Line M1 to Line L. Line M2 extends from a point that is equidistant from the points on the edge of guide pin opening 65. Distance S2 is the distance from Line M2 to Line L. Distance S1 equals Distance S2. In one embodiment, S1 and S2 may be 3.437 inches.

Line N1 extends from a point that is equidistant from the points on the edge of channel 82. Line N2 extends from a point that is equidistant from the points on the edge of channel 82. Distance T1 is the distance from N1 to Line X. Distance T2 is the distance from Line N2 to Line L. Distance T1 equals Distance T2. In one embodiment, T1 and T2 may be 2.500 inches. Line O1 extends from a point that is equidistant from the points on the edge of channel 86. Line O2 extends from a point that is equidistant from the points on the edge of channel 86. Distance U1 is the distance from Line O1 to Line L, and Distance U2 is the distance from Line O2 to Line L. Distance U1 equals Distance U2. In one embodiment, both U1 and U2 may be 3.500 inches. Inner reaming block 80 maintains tolerance because S1 equals S2, T1 equals T2, and U1 equals U3.

An angled view of the inner reaming block 80 couple to exterior reaming block 60 is shown in FIG. 17. Alignment bolts 100 and alignment pins 90 are coupling the two blocks together. Line X extends from the center point of alignment bolt 100. Lines Q1 and Q2 extend from alignment pins 90. Distances F1 and F2 are the distances from Lines Q1 and Q2, respectively, to Line X. As noted above, Distances F1 and F2 are equal and may be 2.500 inches. Lines ZB1 and ZB2 extend from alignment bolts 100. Distances C1 and C2 are the distances from Lines ZB1 and ZB2, respectively, to Line X. Both Distances C1 and C2 are equal may be 3.500 inches. Lines Y1 and Y2 extend from opening 67. Distances D1 and D2 are the distances from Lines Y1 and Y2, respectively, to Line X. Distances D1 and D2 are equal and may be 3.437 inches.

FIG. 18 depicts alignment pin 90 that is utilized to couple the two blocks together. Alignment pin 90 is specially formed to fit through the two blocks. Alignment bolt 100 is shown in FIG. 19. Alignment bolt 100 is specially formed to traverse and couple inner reaming block 80 to exterior reaming block 60.

An angled front view of reamer guide block 120 is depicted in FIG. 20, and a mid-sectional view is illustrated in FIG. 21. Reamer guide block 120 may be composed of aluminum or other suitable material. Channel 122 is formed to accept reamer 130, and channels 124 are formed to accept captive screw 110. The head of captive screw 110 locks into cavity 123 and the length of captive screw 110 traverses channel 124.

FIG. 20 includes dimension lines. Line X2 extends from a point that is equidistant from the points on the edge of channel 122. Lines W1 and W2 extends from a point that is equidistant from the points on the edge of channels 124. Distance K1 is the distance from Line W1 and Line X2. Distance K2 is the distance from Line W2 and Line X2. Distances K1 and K2 are equal and are equidistant from Line X2. In one embodiment, K1 and K2 may be 0.937 inches. The position of channels 124 equidistant from channel 122 allows tolerance to be achieved during use of the device herein.

A side view of reamer 130 is shown in FIG. 22 and a end view is shown in FIG. 23. Reamer 130 fits within channel 122. Shank end 136 of reamer 130 couples to an extension. Locator hole 133 allows reamer stop 142 to be attached to reamer 130. Cutting edges 132 and 134 ream newly installed full bushing 10 creating a smooth wall along bushing opening 11 inside full bushing 10 so that stabilator 2 can be re-installed on the Black Hawk helicopter. If reaming is not performed, then bushing opening 11 will be rough causing full bushing 10 to be unstable leading to failure of the bushing, and a possible catastrophic outcome for the Black Hawk helicopter. FIG. 23 depicts cutting edges 132 and 134. Cutting edges 132 and 134 create a smooth surface on the bushing opening 11, which is the interior lining of full bushing 10. Full bushing opening 11 forms a lining for forward stabilator lug 6 and aft stabilator lug 8 allowing the attachment of stabilator 2 to the Black Hawk helicopter. There may be two differently sized reamers wherein a first reamer 130 has cutting edges 132 and 134 for the full bushing 10 sized and installed in the aft stabilator lug 8 and a second reamer 130 has cutting edges 132 and 134 for full bushing 10 sized and installed in the forward stabilator lug 6. For example, aft lug bore 9 may be slightly smaller than forward lug bore 9.

Reamer extension 140 (shown in FIG. 24) includes socket 145 allowing reamer extension 140 to couple to a drill operated by a technician. Setscrew 144 allows reamer extension 140 to couple to reamer 130. Reamer stop 142 (shown in FIGS. 25 and 26), which is a collar, may include setscrew 146 that allows it to be positioned upon reamer 130 at a predetermined position so that the length of reamer 130 is stopped at the point preventing the length of reamer 130 that can traverse reamer guide block 120 during the reaming process. Reamer stop 142 is positioned onto the shaft of reamer 130 to prevent over-reaming wherein cutting edges 132 and 134 would cut into inner reaming block 80.

An angled top view of the reamer guide block assembly is shown in FIG. 27, while a top, front, and rear view are depicted in FIG. 28. A side view of the reamer block assembly is shown in FIG. 29. Reamer 130 (with cutting edges 132 and 134) traverses reamer guide block 120, two captive screw 110 traverse reamer guide block 120, reamer stop 142 limits the movement of reamer 130 during the reaming process, collar stop 150 provides a stop on the surface of reamer guide block 120 for reamer stop 142, reamer extension 140 allows a user to be positioned so that he or she has room to place drill 200 away from stabilator 2 while reaming full bushing opening 11, and socket 145 allows a user to couple a drill to the guide block assembly to provide the force and power necessary to ream full bushing 10.

FIG. 30 depicts reamer guide block 120 with two captive screw 110 installed. Collar stop 150 is seen on the surface of reamer guide block 120.

An angled side view of stabilator 2 with two reaming block assemblies and two reamer guide block assemblies attached is shown in FIG. 31. Once a reaming block assembly (parts 80, 60, 110, and 90 depicted) has been installed upon stabilator 2, then a reamer guide block assembly (parts 120, 130, 142, and 140 depicted) may be coupled to the reamer guide block assembly. Once a tech couples a wrench or a drill to reamer extension 140, full bushing 10 may be reamed. The configuration shown in FIG. 31 would allow two technicians to ream two full bushings 10 at one time.

FIG. 32 depicts a user coupling drill 200 to reamer extension 140 via universal joint socket 170. Universal joint socket 170 allows a user to position to maintain the optimum position during the reaming process. Standard universal joint socket 170 is depicted in FIG. 33. Universal joint socket 170 allows a user to hold drill 200 at an angle so that full bushing 10 is not over reamed wherein opening 11 is too large.

FIG. 34 depicts the GO/NO-GO assembly 210 for the aft stabilator full bushing 10, while FIG. 34B shows a forward stabilator full bushing 10 GO/NO-GO assembly 219. In order to confirm that full bushing 10 has been correctly reamed, a user removes the reaming block assembly-reamer guide block assembly from the aft stabilator lug 8 and inserts the aft GO/NO-GO assembly 210. Stub 216 of the GO end is formed into the correct shape and size for the reamed full bushing 10. Stub 214 of the NO-GO end may be slightly larger than stub 216 of the GO end. If stub 214 of the NO-GO end of the assembly fits snugly into the newly reamed full bushing 10, then the user should reinstall the reaming block assembly-reamer guide block assembly back onto the aft stabilator lug 8 and ream full bushing 10 until the side walls 13 of full bushing 10 are flush with lug bore 9 and Stub 216 of the GO end fits snugly into reamed full bushing 10.

GO/NO-GO assembly 219 is utilized to assess whether full bushing 10 on the forward stabilator lug 6 has been correctly reamed. A user removes the reaming block assembly-reamer guide block assembly from the forward stabilator lug 8 and inserts the aft GO/NO-GO assembly 219. Stub 217 of the GO end is formed into the correct shape and size for the reamed full bushing 10. Stub 215 of the NO-GO end may be slightly larger than stub 217 of the GO end. If stub 215 of the NO-GO end of the assembly fits snugly into the newly reamed full bushing 10, then the user should reinstall the reaming block assembly-reamer guide block assembly back onto the forward stabilator lug 8 and ream full bushing 10 until the side walls 13 of full bushing 10 are flush with lug bore 9 and Stub 217 of the GO end fits snugly into reamed full bushing 10.

FIG. 35 illustrates an angled side view of replacement full bushing 10, and FIG. 35B illustrates a front view. Full bushing 10 includes opening 11 that reamer 130 fits into to ream side wall 13. Side wall 13 is reamed so that it is smooth and flush against lug bore 9. Rim 22 is installed flush with the surface of aft stabilator lug 8 or forward stabilator lug 6. Lug washer 19 is illustrated in FIG. 35C. Lug washer 19 has a shape and size of rim 22. Lug washer 19 is fixed onto aft stabilator lug 8 or forward stabilator lug 6 with epoxy.

FIG. 36 depicts aft removal plunger 22 which includes threads 323 for insertion of removal bolt 24. FIG. 37 depicts forward removal plunger 22F, which includes threads 323F for insertion of removal bolt 24. The aft removal plunger 22 and forward removal plunger 22F remove the damaged full bushing from stabilator 2.

An angled side view of spacer cup 20 is depicted in FIG. 38, while a mid-sectional view is shown in FIG. 39. Spacer cup 20 includes cavity 321 for catching or holding a full or half bushing upon removal or installation of said bushing. Removal bolt 24 is shown in FIG. 39.

Aft installation anvil 23 is depicted in FIG. 41, and forward installation anvil 23F is depicted in FIG. 41. Installation anvil 23 and 23F pulls full bushing 10 the stabilator 2. Installation anvil threads 27 and installation anvil threads 27F allow the insertion of installation bolt 25 allowing installation of a replacement full bushing 10 in the aft stabilator lug 8 and forward stabilator lug 6, respectively.

FIG. 42 depicts the forward and aft threaded removal tool. The forward and aft removal tool allows a technician to remove a damaged split bushing. Currently, there is no practical way to remove split bushings. The aft end 131 of the tool is the aft sized end, while 131F is sized for forward split bushings, which may be larger diameter than aft split bushings. A user inserts the appropriate end of the threaded removal tool (either end 131 or 131F) into the split bushing pushing the removal tool stop (aft end 139, forward end 139F). Next, spacer cup 20 is placed onto the tool, and nut 40 (pictured in FIG. 44) is screwed onto the tool threads 133 until nut 4 reaches nut stop 134. Expansion bolt 230 is inserted through the other side of the split bushing and tightened along threads 233. Expansion bolt 230 is shown in FIG. 43. Nut 40 and spacer cup 20 are moved toward expansion bolt 230. Expansion bolt 230 pulls split bushing out of lug bore 9. The split bushing falls into spacer cup 20. Full bushing 10 may not be installed. This tool and method may be utilized on race cars and other aircraft that utilize split bushings that may need to be removed and/or replaced.

Captive screw 110 is shown in FIG. 45. Captive screw 110 is screwed into the reamer guide lock 120.

FIG. 46 depicts the components of the system and method herein packed within a carrying case. All necessary components will fit into a single carrying case allowing a technician anywhere in the world to a portable means of servicing a Black Hawk stabilator. This ensures that necessary maintenance and repair can be conducted at field-level reducing helicopter down time and expense.

I hereby claim:

1. A device for reaming a helicopter stabilator lug bushing comprising:
   a reamer, and
   a reaming block assembly,
   wherein the reaming block assembly comprises an outer block, an inner block, and a reamer guide block,
   wherein the outer block is positioned onto an outer surface of a helicopter stabilator lug, wherein the outer block includes:
   a first outer surface, a second outer surface opposite to the first outer surface, and a peripheral surface extending between the first outer surface and the second outer surface, wherein a central recess in the peripheral surface extends between the first outer surface and the second outer surface, wherein the peripheral surface includes a central convexly curved protrusion opposite to the central recess, the central convexly curved protrusion extends between the first outer surface and the second outer surface,
   two bushing openings, wherein each of the two bushing openings has a central longitudinal axis, the central longitudinal axis of each bushing opening is equidistant from a middle longitudinal axis of an outer block middle channel, wherein each of the two bushing openings allows the reamer to make contact with an inside lining of the helicopter stabilator lug bushing, wherein each of the two bushing openings is formed to allow the reamer to move in and out of each of the two bushing openings,
   wherein the outer block middle channel accepts a first alignment bolt, wherein the outer block middle channel is positioned at a point that is one-half a length of the outer block measured in a first direction perpendicular to the middle longitudinal axis,
   two outer block pin channels, wherein each of the two outer block pin channels is formed to accept a respective guide pin, wherein each of the two outer block pin channels has a central longitudinal axis, wherein each central longitudinal axis of the two outer block pin channels is equidistant from the middle longitudinal axis of the outer block middle channel,
   two outer block bolt channels, wherein each of the two outer block bolt channels has a central longitudinal axis, wherein each central longitudinal axis of the two outer block bolt channels is equidistant from the middle longitudinal axis of the middle channel, wherein each of the two outer block bolt channels accepts a respective second alignment bolt, wherein, in a second direction perpendicular to the middle longitudinal axis, one of the two outer block bolt channels is positioned below a respective one of the two outer block pin channels, wherein each of the two outer block bolt channels and each of the two outer block pin channels is at a greater distance from the middle longitudinal axis of the outer block middle channel than the two bushing openings, and
   at least two reaming guide block coupling channels, wherein the at least two reaming guide block coupling channels are threaded for attaching the reamer guide block to the first outer surface of the outer block,
   wherein the inner block is positioned onto an inner surface of the helicopter stabilator lug, wherein the inner block includes:

two inner block bushing openings, wherein each of the two inner block bushing openings has a central longitudinal axis, the central longitudinal axis of each bushing opening is equidistant from an inner block mid-plane extending parallel to the central longitudinal axis of each of the two inner block bushing openings, wherein the two inner block bushing openings are respectively mirror symmetric about the inner block mid-plane, an inner block middle channel, wherein the inner block middle channel accepts the first alignment bolt, wherein the inner block middle channel is positioned at a point that is one-half a length of the inner block, wherein the inner block mid-plane intersects the inner block middle channel, two guide pins, wherein each of the guide pins is formed onto an exterior surface of the inner block, wherein each of the two guide pins is inserted into a respective one of the outer block pin channels, wherein the two guide pins are respectively mirror symmetric about the inner block mid-plane, and two inner block bolt channels, wherein each of the two inner block bolt channels has a central longitudinal axis, wherein each central longitudinal axis of the two inner block bolt channels is equidistant from the inner block mid-plane, wherein each of the two inner block bolt channels accepts the respective second alignment bolt, wherein each of the two inner block bolt channels is positioned below a respective one of the two guide pins, wherein each of the two inner block bolt channels and each of the two guide pins is at a greater distance from the inner block mid-plane than the two inner block bushing openings, wherein the two inner block bolt channels are respectively mirror symmetric about the inner block mid-plane, wherein the outer block and the inner block are attached to each other via the first alignment bolt, each of the respective second alignment bolt, the two guide pins, and an alignment pin received within one of the two bushing openings in the outer block and a corresponding one of the two inner block bushing openings, wherein the reamer guide block is positioned onto the outer block, wherein the reamer guide block includes:
a reamer opening, wherein the reamer opening is formed to allow the reamer to make contact with the inside lining of the helicopter stabilator lug bushing, wherein the reamer opening is in alignment with one of the two bushing openings in the outer block and a matching one of the two inner block bushing openings, and two reaming block coupling channels, wherein each of the two reaming block coupling channels is formed to accept a captive screw, wherein each captive screw couples the reamer guide block to the outer block.

2. The device of claim 1 further including an extension member that couples to the reamer.

3. The device of claim 2 further including a depth stop collar that couples to the reamer and limits the reaming depth.

4. The device of claim 2 further comprising a universal joint socket that couples to the extension member, wherein the universal joint socket allows the reamer to couple to a drill, wherein the universal joint allows the drill to rotate relative to the reamer.

5. A kit for replacing a helicopter stabilator lug bushing comprising:
a removal assembly, wherein the removal assembly comprises:
a spacer cup formed to receive the stabilator lug bushing,
a removal bolt, wherein the bolt is inserted into the spacer cup so that the head of the bolt is positioned against the spacer cup and the length of the bolt traverses the spacer cup, and
a removal plunger, wherein the removal plunger is formed so that it fits against the aft side of the stabilator lug bushing, wherein the removal plunger is formed with a length that fits within the stabilator lug bushing, wherein the length of the removal plunger is threaded to receive the length of the bolt,
an installation assembly, wherein the installation assembly comprises:
glue that secures a lug washer onto a replacement stabilator lug bushing, and
a spring clamp that holds the lug washer in place while the glue is drying, and
the device for reaming a helicopter stabilator lug bushing according to claim 1.

6. A kit for replacing a helicopter stabilator lug bushing comprising:
a removal assembly, wherein the removal assembly comprises
a threaded puller, wherein the threaded puller includes a slotted end,
a hex nut, wherein the hex nut is positioned onto the threaded puller,
a spacer cup formed to receive the stabilator lug bushing, wherein the slotted end of the threaded puller is inserted into spacer cup so that the length of the threaded puller traverses the spacer cup, and
an expansion tip, wherein the expansion tip includes a head that is formed to fit against the aft side of the stabilator lug bushing, wherein the expansion tip includes a length that traverses the stabilator lug bushing, wherein the expansion tip is formed to accept the slotted end of the threaded puller,
an installation assembly, wherein the installation assembly comprises:
glue that secures a lug washer onto a replacement stabilator lug bushing, and
a spring clamp that holds the lug washer in place while the glue is drying, and
the device for reaming a helicopter stabilator lug bushing according to claim 1.

* * * * *